United States Patent
Matsuo et al.

(10) Patent No.: US 11,412,545 B2
(45) Date of Patent: *Aug. 9, 2022

(54) WIRELESS COMMUNICATION DEVICE, WIRELESS COMMUNICATION TERMINAL, AND WIRELESS COMMUNICATION METHOD

(71) Applicant: KABUSHIKI KAISHA TOSHIBA, Tokyo (JP)

(72) Inventors: Ryoko Matsuo, Tokyo (JP); Tomoya Tandai, Tokyo (JP); Toshihisa Nabetani, Kanagawa (JP)

(73) Assignee: TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,076

(22) Filed: Feb. 5, 2019

(65) Prior Publication Data

US 2019/0174544 A1   Jun. 6, 2019

Related U.S. Application Data

(63) Continuation of application No. 15/457,166, filed on Mar. 13, 2017, now Pat. No. 10,244,557.

(30) Foreign Application Priority Data

Sep. 20, 2016   (JP) .................. 2016-183293

(51) Int. Cl.
*H04W 74/08* (2009.01)
*H04W 16/14* (2009.01)
*H04W 84/12* (2009.01)

(52) U.S. Cl.
CPC ........ *H04W 74/0816* (2013.01); *H04W 16/14* (2013.01); *H04W 84/12* (2013.01)

(58) Field of Classification Search
None
See application file for complete search history.

(56) References Cited

U.S. PATENT DOCUMENTS 10,257,859 B1 * 4/2019 Chu .................. H04W 74/0808
2016/0149676 A1   5/2016 Jauh et al.
(Continued)

FOREIGN PATENT DOCUMENTS

| WO | WO-2016/062263 A1 | 4/2016 |
| WO | WO-2016/175328 A1 | 11/2016 |
| WO | WO-2016/175329 A1 | 11/2016 |

OTHER PUBLICATIONS

Huang et al.: "NAV Consideration for UL MU Response Follow Up", IEEE 802.11-15/1326r2, Intel, Nov. 2015, pp. 1-23.
(Continued)

*Primary Examiner* — Faruk Hamza
*Assistant Examiner* — Cassandra L Decker
(74) *Attorney, Agent, or Firm* — Foley & Lardner LLP

(57) ABSTRACT

According to one embodiment, a wireless communication device includes: controlling circuitry configured to set at least one of: a first transmission prohibition period for a first network to which the wireless communication device belongs; or a second transmission prohibition period for a second network, and to determine, when a first frame addressed to another device is received in a case that the first transmission prohibition period is not set and the second transmission prohibition period is set, a state of a wireless medium based on comparing a reception level of the first frame with a threshold defined corresponding to one of the first network and the second network, to which a sender of the first frame belongs.

6 Claims, 21 Drawing Sheets

(56) References Cited

U.S. PATENT DOCUMENTS

| | | | |
|---|---|---|---|
| 2016/0150534 A1* | 5/2016 | Kwon | H04W 72/0446 370/338 |
| 2016/0381688 A1* | 12/2016 | Hedayat | H04L 27/26 370/329 |
| 2017/0064739 A1 | 3/2017 | Hedayat et al. | |
| 2017/0078887 A1* | 3/2017 | Barriac | H04W 72/082 |
| 2017/0311352 A1 | 10/2017 | Lv et al. | |
| 2017/0367129 A1* | 12/2017 | Yang | H04W 24/02 |
| 2018/0007561 A1 | 1/2018 | Adachi et al. | |
| 2018/0007701 A1 | 1/2018 | Adachi et al. | |
| 2018/0054818 A1 | 2/2018 | Kakani et al. | |
| 2018/0249503 A1* | 8/2018 | Kim | H04W 74/0816 |

OTHER PUBLICATIONS

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

Khorov et al.: "Multiple NAV's for Spatial Reuse", IEEE 802.11-15/1348, IITP, Nov. 2015, pp. 1-11.

Kim et al.: "MU TXOP Truncation", IEEE 802.11-15/1067r0, LG Electronics, Sep. 2015, pp. 1-16.

Notice of Allowance on U.S. Appl. No. 15/457,166 dated Nov. 6, 2018.

Stacey, Robert: "Specification Framework for TGax", IEEE 11-15-0132-17-00ax-spec-framework, Intel, May 2016, pp. 1-61.

Stacey, Robert: "Specification Framework for TGax", IEEE 802.11-15/0132-17-00, Intel, May 2016, pp. 1-61.

U.S. Office Action on U.S. Appl. No. 15/457,166 dated May 23, 2018.

\* cited by examiner

| MAC Header | Frame Body | FCS |

WIRELESS COMMUNICATION DEVICE, WIRELESS COMMUNICATION TERMINAL, AND WIRELESS COMMUNICATION METHOD

CROSS-REFERENCE TO RELATED APPLICATIONS

This application is a Continuation of U.S. patent application Ser. No. 15/457,166, filed Mar. 13, 2017, to which priority is claimed under 35 U.S.C. § 120. As in the parent application Ser. No. 15/457,166, this application is also based upon and claims the benefit of priority from Japanese Patent Application No. 2016-183293, filed on Sep. 20, 2016; the entire contents of which are incorporated herein by reference.

FIELD

Embodiments according to the present invention relate to a wireless communication device, a wireless communication terminal, and a wireless communication method.

BACKGROUND

In a conventional method for managing a wireless channel, virtual carrier sensing is performed by setting, on the basis of information in a received packet, an NAV (Network Allocation Vector) which is a transmission prohibition period. Whether the received packet has been transmitted from a BSS (Basic Service Set) to which a receiver terminal belongs, or a separate BSS adjacent thereto, that is, an Overlapping BSS (OBSS), does not matter. A BBS to which a receiver terminal belongs is referred to as an "own BSS", and other BSSs are referred to as "OBSSs".

In addition, a method has been proposed in which NAV management is performed in different manners depending on whether a received packet has been transmitted from an own BSS or an OBSS. A NAV set on the basis of a packet received from an own BBS is referred to as "Intra-BSS NAV", and a NAV set on the basis of a packet received from an OBSS is referred to as "Regular NAV".

As a technique for effective use of a wireless channel, Dynamic Sensitivity Control (DSC) has been proposed (which is also referred to as "Spatial reuse"). In some methods using the DSC technique, whether a received packet has been transmitted from an own BSS is determined on the basis of BSS coloring information included in the header of the packet, and a threshold for carrier sensing, that is, a CCA (Clear Channel Assessment) threshold is controlled according to the result of the determination.

The aforementioned DSC may be performed in an environment where an Intra-BSS NAV and a Regular NAV are managed. However, any specific technique for utilizing an Intra-BSS NAV and a Regular NAV in such a case has not been proposed yet.

DETAILED DESCRIPTION

Figure 1:
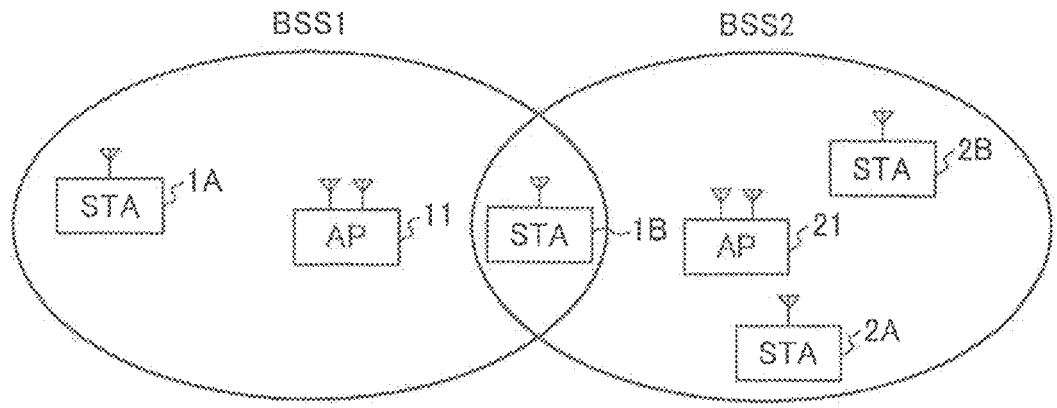
FIG. 1 is a diagram illustrating a wireless communication system including a base station and a plurality of terminals.

According to one embodiment, a wireless communication device includes: controlling circuitry configured to set at least one of: a first transmission prohibition period for a first network to which the wireless communication device belongs; or a second transmission prohibition period for a second network, and to determine, when a first frame addressed to another device is received in a case that the first transmission prohibition period is not set and the second transmission prohibition period is set, a state of a wireless medium based on comparing a reception level of the first frame with a threshold defined corresponding to one of the first network and the second network, to which a sender of the first frame belongs.

Embodiments of the present invention will be explained below, with reference to the accompanying drawings. IEEE Std 802.11 (TM)-2012 and IEEE Std 802.11ac (TM)-2013 that are known as standards of wireless LANs, as well as IEEE 802.11-15/0132r17 uploaded on May 25, 2016 and serving as a specification framework document for IEEE Std 802.11ax, which is a standard of next-generation wireless LANs, are incorporated by reference in its entirety in the present disclosure.

First Embodiment

The present embodiment relates to a wireless communication system that achieves effective use of a wireless channel in an environment where a Regular NAV (Network Allocation Vector) and an Intra-BSS NAV can be set and DSC (Dynamic Sensitivity Control) can be performed. The present embodiment assumes a wireless LAN (Local Area Network) system compliant with IEEE802.11, but is not limited to such a system. DSC is referred to as "Spatial Reuse" in some cases.

Here, a NAV refers to a way to virtually determine that a wireless medium is busy, or a time period during which the medium is virtually regarded as being busy. An NAV corresponds to a transmission prohibition period. When receiving a MAC (Medium Access Control) frame addressed to a different terminal, a wireless communication terminal (hereinafter, "terminal") sets a NAV on the basis of a medium reservation time which is written in the Duration/ID field of the MAC header from the tail end of a packet including the MAC frame. In a time period during which the NAV is set, the terminal is prohibited from accessing a wireless medium, that is, performing transmission.

An Intra-BSS NAV is set on the basis of a packet received within a BSS (Basic Service Set) to which a receiver terminal belongs. A Regular NAV is set on the basis of a packet received from an adjacent separate BSS, that is, an Overlapping BSS (OBSS). A BSS corresponds to a network formed by an access point.

Dynamic Sensitivity Control (DSC) is a technique of enhancing the use efficiency of a wireless channel by appropriately switching a threshold for carrier sensing, that is, a CCA (Clear Channel Assessment) threshold according to the environment.

In a wireless LAN, in order to acquire an access right, a terminal performs carrier sensing for a waiting time, which is the total of a predetermined time and a back-off time which is randomly determined using a random number. When the reception level of a signal subjected to the carrier sensing is less than a CCA threshold, the terminal determines that the state (a carrier sensing result) of a wireless medium is idle and acquires an access right. When the reception level of a signal subjected to the carrier sensing is equal to or greater than a CCA threshold, the terminal determines that the state (the carrier sensing result) of a wireless medium is busy and does not acquire an access right. Hereinafter, this operation including carrier sensing for acquiring an access right may be referred to as a back-off process.

The present embodiment has a feature in which performing DSC is controlled according to the Intra-BSS NAV and Regular NAV setting state of a terminal and the BSS (a network) to which the sender of a received frame belongs. In an example, when receiving a frame from an OBSS while an Intra-BSS NAV is not set but a Regular NAV is set, a terminal performs DSC. That is, as a threshold to be compared with the reception level of the frame, a CCA threshold greater than an initial value is used (that is, the value of the threshold is changed). When the reception level of the frame is less than the CCA threshold, a wireless channel (a wireless medium) is considered to be idle. In this case, a frame is transmitted even while a Regular NAV is set. In this way, even while a Regular NAV is set, the Regular NAV is ignored and priority is given to DSC. Therefore, opportunities to transmit packets are increased, and the use efficiency of the wireless channel is enhanced. Hereinafter, the present embodiment will be described in detail.

FIG. 1 illustrates a wireless communication system according to the present embodiment. The wireless communication system includes an access point (AP) 11 which is a base station, and a terminal (STA: station) 1A, and a terminal 1B. A BSS (Basic Service Set) 1, that is, a wireless network is formed by the access point 11. The terminals 1A, 1B each have been connected to the access point 11 as a result of performing an association process, and belong to the BSS 1. Since the access point 11 has same functions, except for a relaying function, as those of the terminal (the station), the access point 11 is one form of a terminal. The term "non-base station terminal" refers to a station, but the simple term "wireless communication terminal (terminal)" may refer to a station, or may refer to an access point.

A separate BSS 2 is adjacent to the BSS 1. The BSS 2 is formed by an access point 21. Terminals 2A, 2B each have been connected to the access point 21 as a result of performing an association process, and belong to the BSS 2.

In the BSS 1, communication is performed through at least one wireless channel (one wireless channel is assumed herein) selected from among a plurality of wireless channels arranged at constant frequency intervals. It is assumed that, also in the BSS 2, communication is performed through the same wireless channel as that in the BSS 1. The wireless channel mentioned above is a frequency channel. Hereinafter, a wireless channel will be referred to as "channel" simply in some cases.

An example in which a CCA threshold is controlled by DSC will be described below, with reference to the wireless communication system illustrated in FIG. 1. It is assumed that the terminal 1B in the BSS 1 has data to be transmitted to the access point 11. In order to acquire an access right in accordance with CSMA/CA (Carrier Sense Multiple Access with Carrier Avoidance), the terminal 1B performs carrier sensing of the wireless medium for a waiting time (a carrier sensing time) which is the total of a fixed duration (or fixed time period) and a randomly determined back-off time. When the CCA value is less than the CCA threshold, the terminal 1B acquires an access right. The CCA value indicates the reception level of a signal received from the wireless medium. For example, during the waiting time, an average CCA value of each fixed time is less than the CCA threshold, the wireless medium is determined to be idle, and thus, the terminal 1B acquires an access right. The terminal 1B having acquired the access right generates a MAC frame including data, more specifically, a physical packet obtained by adding a physical header to a MAC frame, and transmits the generated physical packet as a radio signal to space. On the other hand, when the CCA value becomes equal to or greater than the threshold in the carrier sensing, or for example, when, in a certain time section, the average CCA values of each fixed time becomes equal to or greater than the threshold, the wireless medium is determined to be busy, and thus, the back-off operation is stopped. In this case, carrier sensing is performed again, as needed.

Figure 2:
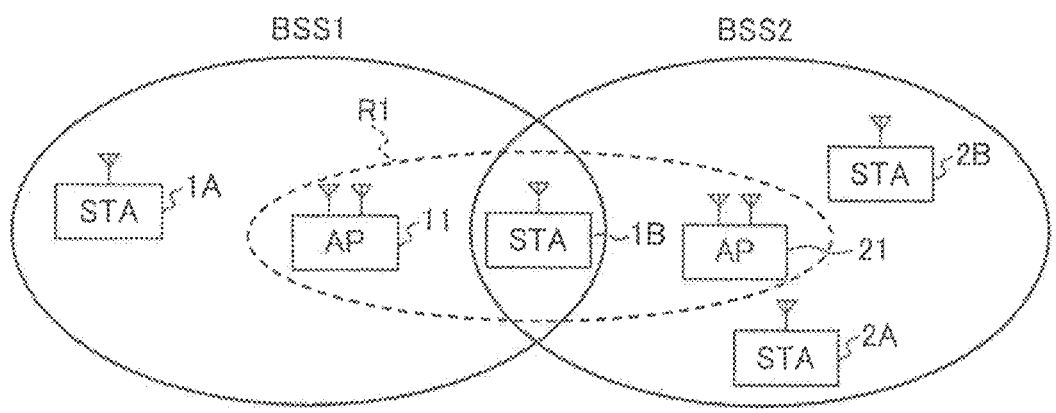
FIG. 2 is a diagram exemplifying DSC.

FIG. 2 illustrates a range (a signal detection range) R1 in which the terminal 1B can detect a signal from a separate terminal in a case where a predetermined initial value (a default CCA threshold) is set, as the CCA threshold, in the terminal 1B. For example, the initial value of −82 dBm may be used. However, the present invention is not limited to this value. In the state illustrated in the drawing, when the access point 21 performs transmission while the terminal 1B is performing carrier sensing, the level of a signal received by the terminal 1B from the access point 21 is equal to or greater than the CCA threshold. Thus, the carrier sensing result indicates that the wireless medium is busy.

Figure 3:
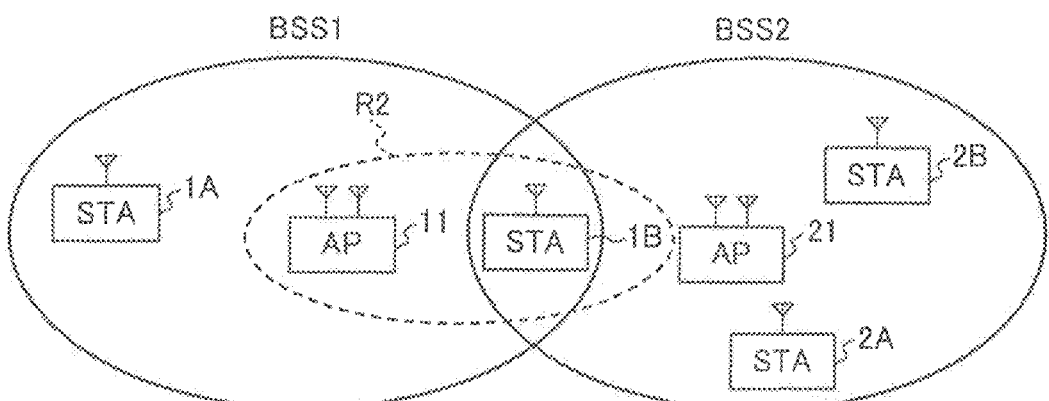
FIG. 3 is a diagram exemplifying DSC.

By increasing the CCA threshold of the terminal 1B, the signal detection range of the terminal 1B can be narrowed down. In this case, the CCA threshold is set such that the signal detection range of the terminal 1B does not include the access point 21 in the BSS 2, and thereby, the terminal 1B becomes unable to detect a signal from the access point 21. The example of this case is illustrated in FIG. 3. If the initial value of the CCA threshold is −82 dBm in the example in FIG. 2, the CCA threshold can be, for example, −62 dBm in the example in FIG. 3. A signal detection range R2 in FIG. 3 is narrower than the signal detection range in FIG. 2. The access point 21 is not included in the signal detection range R2. Accordingly, when the access point 21 transmits a signal while the terminal 1B is performing carrier sensing, the reception level of the signal at the terminal 1B is less than the CCA threshold. Thus, the carrier sensing result indicates that the wireless medium is idle.

As a result of changing the CCA threshold in the terminal 1B such that a signal from the BSS 2 is not detected in this way, opportunities for the terminal 1B to perform transmission is increased, and thereby, effective use of a wireless channel can be achieved. However, if DSC is performed, that is, if the CCA threshold is increased, signal collision with a hidden terminal in the own BSS 1 may be caused to suppress effective use of the wireless channel in the own BSS 1. A hidden terminal is a terminal which has a positional relationship with a certain terminal in the same BSS in which the certain terminal cannot detect a signal transmitted from the hidden terminal. In the example in FIG. 3, the terminal 1A is a hidden terminal. Problems in DSC include interference to an OBSS, in addition to the hidden terminal problem. Against the interference, control of reducing transmission power when a CCA threshold is increased is effective.

The description of DSC has been given above. A description will be given of an example in which a terminal manages NAVs by distinguishing an Intra-BSS NAV and a Regular NAV. Prior to this description, the format of a MAC frame will be described.

Figures 4A, 4B:
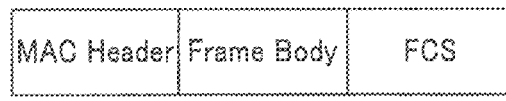
FIGS. 4A and 4B are diagrams showing a basic format example of a MAC frame.

FIG. 4A illustrates the basic exemplary format of the MAC frame. This frame format includes the fields of MAC header, Frame body, and FCS. The MAC header includes, as illustrated in FIG. 4B, the fields of Frame Control, Duration/ID, Address 1, Address 2, Address 3, Sequence Control, QoS Control, and HT (High Throughput) Control.

These fields do not need to always exist and there may be cases where some of these fields do not exist. For example, there may be a case where the Address 3 field does not exist. Also, there may be other cases where both or either one of the QoS Control field and the HT Control field does not exist. Also, there may be still other cases where the frame body field does not exist. Also, any field or fields that are not illustrated in FIG. 4 may exist. For example, an Address 4 field may further exist.

The field of Address 1 indicates Receiver Address (RA), the field of Address 2 indicates Transmitter Address (TA), and the field of Address 3 indicates either BSSID (Basic Service Set IDentifier) (which may be the wildcard BSSID whose bits are all set to 1 to cover all of the BSSIDs depending on the cases) which is the identifier of the BSS, or TA, depending on the purpose of the frame.

Two fields of Type and Subtype (Subtype) or the like are set in the Frame Control field. The rough classification as to whether it is the data frame, the management frame, or the control frame is made by the Type field, and more specific types, for example, fine discrimination among the roughly classified frames, for example, as to whether it is a RTS (Request to Send) frame, CTS (Clear to Send) frame, a BA (Block Ack) frame or a BAR (Block Ack Request) frame within the control frame is made by the Subtype field.

The Duration/ID field describes the medium reserve time, and it is determined that the medium is virtually in the busy state from the end of the physical packet including this MAC frame to the medium reserve time when a MAC frame addressed to another terminal is received. The scheme of this type to virtually determine that the medium is in the busy state, or the period during which the medium is virtually regarded as being in the busy state, is, as described above, called NAV (Network Allocation Vector). The QoS control field is used to carry out QoS control to carry out transmission with the priorities of the frames taken into account. The HT control filed is a filed introduced in IEEE 802.11n. The HT (High Throughput) control field is present when Order field is set to 1 for QoS data frame or a management frame. The HT control field can be extended to a VHT (Very High Throughput) control field in IEEE 802.11ac or an HE (High Efficient) control field in IEEE 802.11ax which is a next-generation wireless LAN standard and can provide notifications corresponding to the functions of 802.11n, 802.11ac, or 802.11ax.

Frame check sequence (FCS) information is set in the FCS field as a checksum code for use in error detection of the frame on the reception side. As an example of the FCS information, CRC (Cyclic Redundancy Code) may be mentioned.

Figure 5A:
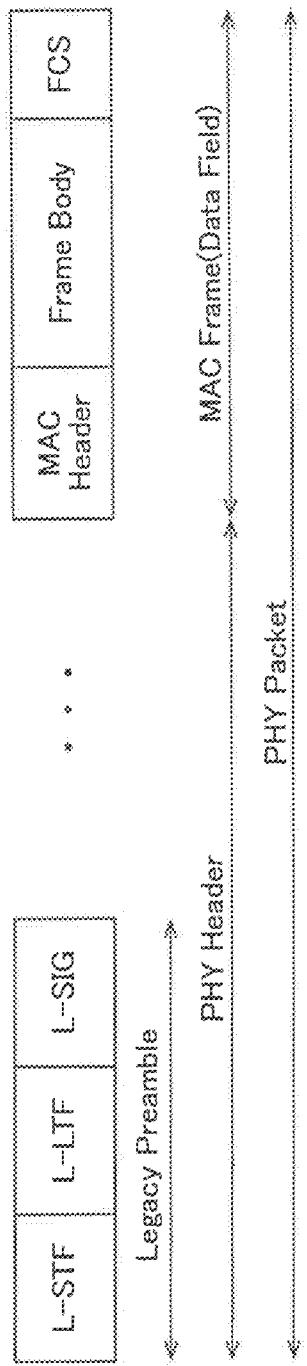
FIGS. 5A, 5B, and 5C are diagrams showing a format example of a packet.
Figure 5B:
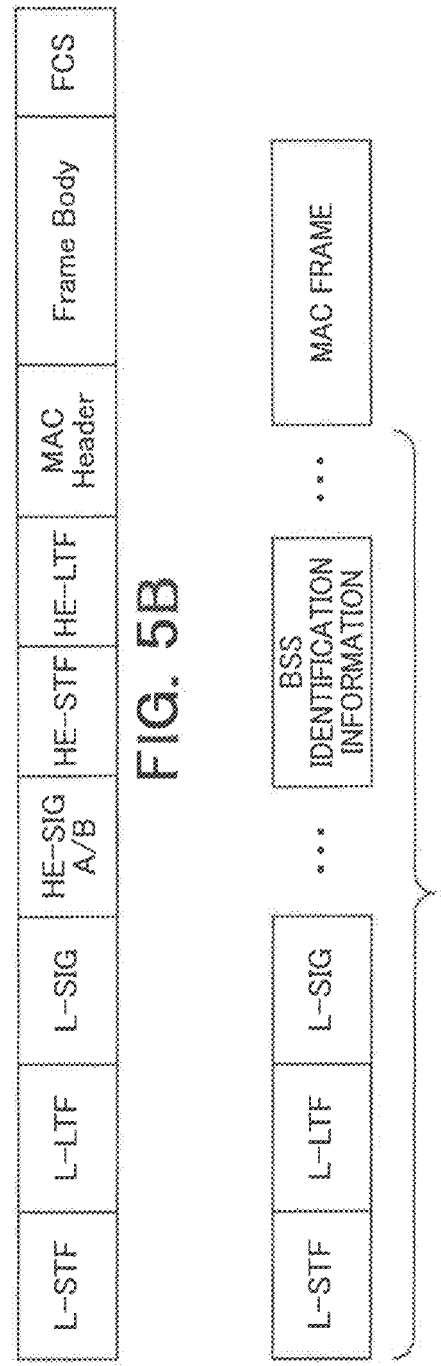

FIG. 5A shows an exemplary format of the physical packet. The physical packet includes a MAC frame set in a data field PHY payload and a physical header attached to the MAC frame. The physical header includes L-STF, L-LTF, and L-SIG. L-STF, L-LTF, and L-SIG are, for example, a field that can be recognized in legacy standards such as IEEE802.11a, and contain information on signal detection, frequency correction, transmission rate, and the like. The physical header may include a field other than those described above, for example, a field that cannot be recognized by a legacy standard terminal but can be recognized by a terminal supporting IEEE802.11ax which is a next-generation LAN standard. For example, as shown in FIG. 5B, at least former one of HE-SIG-A and HE-SIG-B, which have been considered in IEEE802.11ax, and HE-STF, and HE-LTF, etc. may be included.

Figure 6:
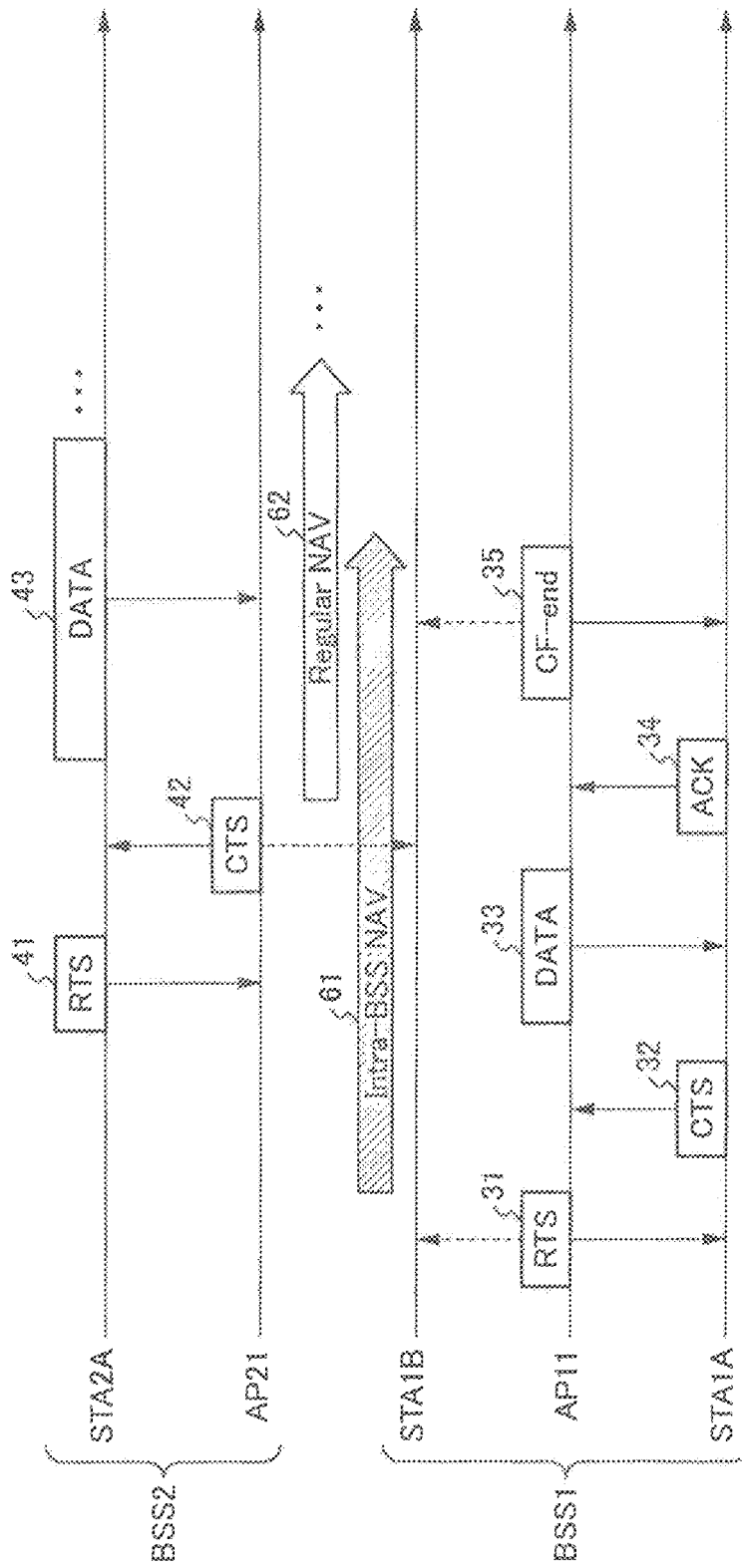
FIG. 6 is a diagram showing a first sequence example according to the present embodiment.

An example in which a terminal manages NAVs by distinguishing an Intra-BSS NAV and a Regular NAV is as follows. FIG. 6 shows a sequence example of a wireless communication system to explain this NAV management. Here, an example in which the terminal 1B (the STA 1B in the drawing) manages these NAVs. It is assumed that the terminal 1B is able to receive signals from the access point 11 (the AP 11 in the drawing) in the own BSS 1 and the access point 21 (the AP 21 in the drawing) in the BSS 2 but unable to receive signals from the terminal 1A in the BSS 1 and the terminal 2A in the BSS 2. The expression "is able to receive" means a state where the reception level of a signal is equal to or greater than a CCA threshold and reception of a frame and acquisition of a Duration value related to NAV setting are possible. The following description includes the expression "a frame is transmitted or received", but actually, a packet obtained by adding, to a frame, a physical header corresponding to the frame type is transmitted or received.

The access point 11 acquires an access right to a wireless medium in accordance with CSMA/CA, and transmits a RTS frame 31. The RTS frame 31 is a frame for requesting a counterpart to give transmission permission. The terminal 1A receives the RTS frame 31, and transmits a CTS frame 32 for giving the sender of the RTS frame 31 transmission permission after elapse of an SIFS. The SIFS is an example of a fixed time period, and the present embodiment is not limited to the SIFS. This applies for the following description.

The RTS frame 31 is also received by the terminal 1B. The terminal 1B sets a NAV (a transmission prohibition period) for a time period corresponding to a value set in the Duration/ID field of the RTS frame 31 because the RTS frame 31 is addressed to a separate terminal (because the RA is the MAC address of the separate terminal). At this time, the terminal 1B sets an Intra-BSS NAV 61 as an NAV because the RTS frame 31 has been transmitted from the own BSS 1. While the Intra-BSS NAV 61 is set, the terminal 1B is prohibited from performing a transmission operation (including a back-off operation).

Whether a network to which the sender of the RTS frame 31 belongs is the own BSS 1 or not is determined on the basis of the TA (Transmitter Address) of the RTS frame 31, in some cases. Depending on the frame type, BSS identification information may be stored in the header of the packet. If so, a method (see FIG. 5C which will be described later) for performing determination on the basis of the BSS identification information, etc. may be used. Examples of BSS identification information include BSS Coloring defined by IEEE802.11 standard.

After elapse of the SIFS since reception of a CTS frame 32, the access point 11 transmits a data frame 33 including data to be transmitted to the terminal 1A. The terminal 1A having received the data frame 33 performs error checking on the basis of CRC information stored in an FCS field of the data frame 33. When determining that no error is found, the terminal 1A transmits an ACK frame 34 at a time at which the SIFS has elapsed. The data frame 33 is also received by the terminal 1B. The terminal 1B updates the Intra-BSS NAV 61 on the basis of a Duration/ID field of the data frame 33. Here, it is assumed that the update does not cause change in the time length of the Intra-BSS NAV 61.

The data frame 33 may be an A-MPDU (A(Aggregated)-MPDU (medium access control (MAC) protocol data unit)) which is formed of a plurality of conjunct MPDUs. In this case, a Block Ack (BA) frame is transmitted as an acknowledgement response (the same applies hereafter).

After receiving the ACK frame 34 from the terminal 1A, the access point 11 transmits a CF-end frame 35. A CF-End frame is a frame for permitting an access to a wireless medium after elapse of CFP (Contention Free Period) or after acquisition of an access right (a transmission right). The CF-End frame 35 is received by the terminal 1A, and the terminal 1A determines that an access by DCF (Distributed Coordination Function), that is, an operation of transmitting a frame after acquiring an access right in accordance with CSMA/CA is allowed. The CF-End frame 35 is also received by the terminal 1B. The terminal 1B determines whether the CF-End frame 35 has been transmitted from the own BSS 1. When the terminal 1B determines that the CF-End frame 35 has been transmitted from the own BSS 1, setting of the Intra-BSS NAV 61 is canceled.

On the other hand, in the BSS 2, the terminal 2A transmits an RTS frame 41, and after elapse of the SIFS since completion of reception of the RTS frame 41, the access point 21 transmits a CTS frame 42. After elapse of the SIFS since reception of the CTS frame 42, the terminal 2A transmits a data frame 43 including data to be transmitted to the access point 21.

The CTS frame 42 transmitted from the access point 21 is also received by the terminal 1B in the BSS 1. The terminal 1B sets a NAV period (a transmission prohibition period) according to a value set in a Duration/ID field of the CTS frame 42. Here, a Regular NAV 62 is set because the CTS frame 42 has been transmitted from the BSS 2 (the OBSS).

However, the CTS frame 42 includes an RA field but does not include a TA field, and thus, whether the CTS frame 42 has been transmitted from the OBSS or from the own BSS may be unknown only from the CTS frame 42. According to the present embodiment, in this case, a Regular NAV is set. Some methods for determining whether a CTS frame is transmitted from an own BSS or not will be described later. When the terminal 1B is able to receive the RTS frame 41 transmitted from the terminal 2A in the BSS 2, the terminal 1B sets a Regular NAV on the basis of the RTS frame 41. Since the TA of the RTS frame 41 shows that the sender thereof is in the BSS 2, the terminal 1B in the BSS 1 understands that a network to which the sender of the RTS frame 41 belongs is the BSS 2.

Basically, the terminal 1B is prohibited from performing a transmission operation (including a back-off operation) during the period in which the Regular NAV 62 is set. However, the present embodiment has a feature of performing DSC by ignoring the Regular NAV 62, as described later. After elapse of the Regular NAV 62 or after receiving a CF-end frame from the BSS 2, the terminal 1B cancels the Regular NAV 62.

The example of setting the Intra-BSS NAV and the Regular NAV has been described above. In the present embodiment, in an environment where management of NAVs including an Intra-BSS NAV and a Regular NAV is performed, DSC is appropriately performed to achieve effective use of a wireless channel. The present embodiment will be described in more detail below.

Figure 7:
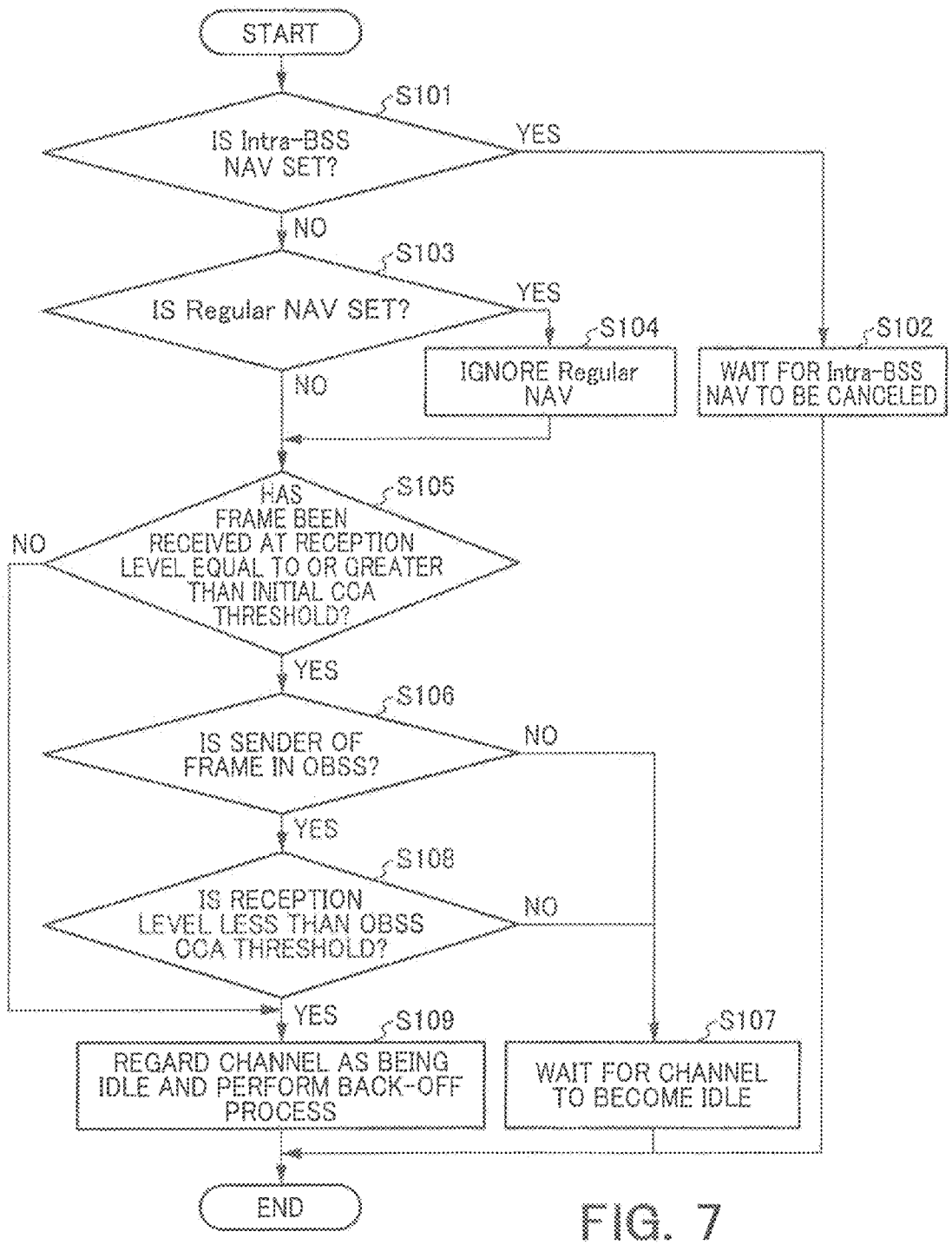
FIG. 7 is a flowchart of an operation example of a terminal according to the present embodiment.

FIG. 7 is a flowchart of operations for controlling execution of DSC according to the setting state of an Intra-BSS NAV and a Regular NAV in a case where a terminal has data to be transmitted. When at least an Intra-BSS NAV of the Intra-BSS NAV and a Regular NAV is set (YES at S101), the terminal does not perform a back-off operation or transmission of the data until the Intra-BSS NAV is canceled (S102). When the Intra-BSS NAV is not set but the Regular NAV is set (YES at S103), the Regular NAV is ignored (S104), and the terminal starts a back-off operation for acquiring an access right for data transmission. That is, the terminal performs carrier sensing for a waiting time which is the total of a fixed duration and the back-off time.

When the terminal does not receive a frame addressed to a separate device at a reception level equal to or greater than an initial CCA threshold (for example, −82 dBm) during the carrier sensing (NO at S105), the terminal determines that the carrier sensing result indicates that a wireless medium is idle, and acquires an access right (S109). When the terminal receives a frame addressed to a separate device at the reception level equal to or greater than the initial CCA threshold (for example, −82 dBm) during the carrier sensing (YES at S105), the terminal determines whether the sender of the frame is in the own BSS or in the OBSS (S106). There are various methods for determining whether the sender of the frame is in the OBSS or not, but the details thereof will be described later. The determination at Step S106 may be performed even before reception of the frame is completed. For example, in the middle of reception of the packet, whether the sender is in the OBSS or not may be determined from the header of the packet or the header of the frame. When the transmitter is in the own BSS, that is, not in the OBSS (NO at S106), the terminal determines that the carrier sensing result indicates that the wireless medium is busy, and waits for the wireless medium (a wireless channel) to become idle (S107). When the wireless channel becomes idle, the operations of the present flow may be started from the beginning.

When the sender is not in the own BSS, that is, in the OBSS, DSC is performed to perform CCA determination using an OBSS CCA threshold (for example, −62 dBm) greater than the initial CCA threshold. That is, whether the reception level of the frame is less than the OBSS CCA threshold or not is determined (S108). When the reception level is equal or greater than the OBSS CCA threshold, the terminal determines that the carrier sensing result indicates that the wireless medium is busy, and waits for the wireless medium (the wireless channel) to become idle (S107). When the wireless channel becomes idle, the operations of the present flow may be started from the beginning.

On the other hand, when the reception level is less than the OBSS CCA threshold, the terminal continues the back-off operation. When the reception level continues being less than the OBSS CCA threshold till the end of the waiting time, the terminal determines that the carrier sensing result indicates that the wireless medium is idle, and acquires an access right (S109). The terminal having acquired the access right, transmits a data frame including data to be transmitted. In a case where the back-off time has been elapsed before determination of whether the sender of the frame is in the OBSS or not is completed, the terminal may wait to perform transmission till the determination is completed, and then transmit a data frame when it is determined that the sender is in the OBSS. Alternatively, in the above case, the terminal may transmit the data frame prior to completion of the determination.

It is considered that, according to the above operations, higher priority is given to the Intra-BSS NAV, DSC, and the Regular NAV, in this order. That is, when the Intra-BSS NAV is set, DSC is not performed to reduce packet interference which may be caused by a hidden terminal, etc. in the own BSS. In a case where the Intra-BSS NAV is not set, even if the Regular NAV is set, the Regular NAV is ignored and DSC is performed as priority, so that opportunities to transmit packets are increased. As a result of performing DSC in an appropriate condition as described above, use efficiency of the wireless channel and the throughput are enhanced.

Methods for determining whether a received frame has been transmitted from an own BSS or a separate BSS (OBSS) will be described.

(First Method) When the TA or RA of a received frame is the BSSID (that is, the MAC address) of the access point of a BSS to which the receiver terminal belongs, it is determined that the received frame is a frame from the own BSS.

Figure 5C:
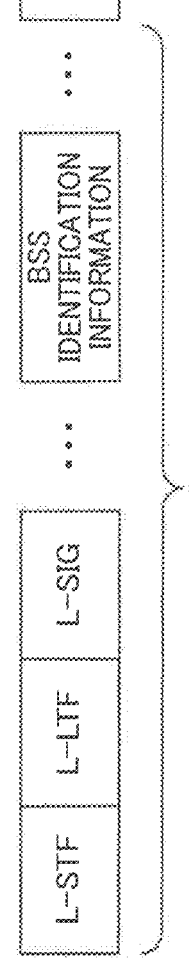

(Second Method) Determination may be performed by using BSS color information (hereinafter, "color information") stored in a physical header. FIG. 5C shows a packet format example in which a BSS Coloring field is included in a physical header. In the field, color information (BSS identification information) is set. The BSS Coloring field may be provided in the HE-SIG-A field in FIG. 5B. An access point or a terminal to transmit a frame sets own-BSS identification information (color information) in the BSS color field of the physical header. The value of color information is determined by the access point and is notified to terminals. Different color information values are determined at least in adjacent BSSs. As a result of using color information described above, whether the sender of a received frame is in an own BSS or not can be determined.

(Third Method) Some frame types have no BSS Coloring field in the physical headers thereof. For example, a CTS frame, an RTS frame, and the like need to be transmitted by packets that can be interpreted by even a legacy terminal (IEEE802.11a/b/g, etc.), and thus, such frames may include no BSS Coloring field in the physical header thereof. Further, a CTS frame includes an RA but does not include a TA. For this reason, when a received frame is a CTS frame, whether the sender belongs to the own BSS or not cannot be determined by the first and second methods. Therefore, the following method is used.

That is, the terminal holds the RAs of frames which have been transmitted so far from the access point in the own BSS but been addressed to separate terminals (that is, frames the TAs of which are each the BSSID of the access point) to create an RA list. When receiving a CTS frame, the terminal determines whether the RA of the CTS frame is included in the RA list. When the RA of the CTS frame is included in the RA list, the terminal determines that the CTS frame has been transmitted from the own BSS. When the RA of the CTS frame is not included in the RA list, the CTS frame may be regarded as having been transmitted from the OBSS.

(Fourth Method) Another method for determining the BSS to which the sender of the CTS frame belongs in a case where a CTS frame is received, is as follows. It is assumed that a terminal (which may be an access point) receives an RTS frame, determines, by the first method and other the like, that the RTS frame has been transmitted from the own BSS, and sets an Intra-BSS NAV. In this case, when the terminal receives a CTS frame after elapse of a fixed duration (e.g., the SIFS) since reception of the RTS frame, the terminal determines that the CTS frame is a response frame to the RTS frame and the CTS frame has been transmitted from the own BSS. Here, whether the sender of a frame is in the own BSS or not is determined. However, whether the sender is in the OBSS or not can be determined in the same manner.

Alternatively, on the basis of the relationship between a value (a Duration value) set in the Duration/ID field of an RST frame and a value (a Duration value) set in the Duration/ID field of a CTS frame, whether the CTS frame has been transmitted from the own BSS or not is determined. For example, when a value obtained by subtracting SIFS and the CTS frame length from the Duration value set in the RTS frame matches the Duration value set in the CTS frame, it is determined that the CTS frame is a response frame to the RTS frame. Accordingly, it is determined that the sender of the CTS frame is in the own BSS. Here, whether the sender of the frame is in the own BSS or not is determined. However, whether the sender is in the OBSS or not can be determined in the same manner.

The BSS of the sender of the frame may be determined by a method other than the first to fourth methods. When whether a received frame has been transmitted from the own BSS or not cannot be determined, the frame may be processed while being regarded as having been transmitted from the OBSS. Alternatively, the frame may be processed while being regarded as having been transmitted from the own BSS.

Figure 8:
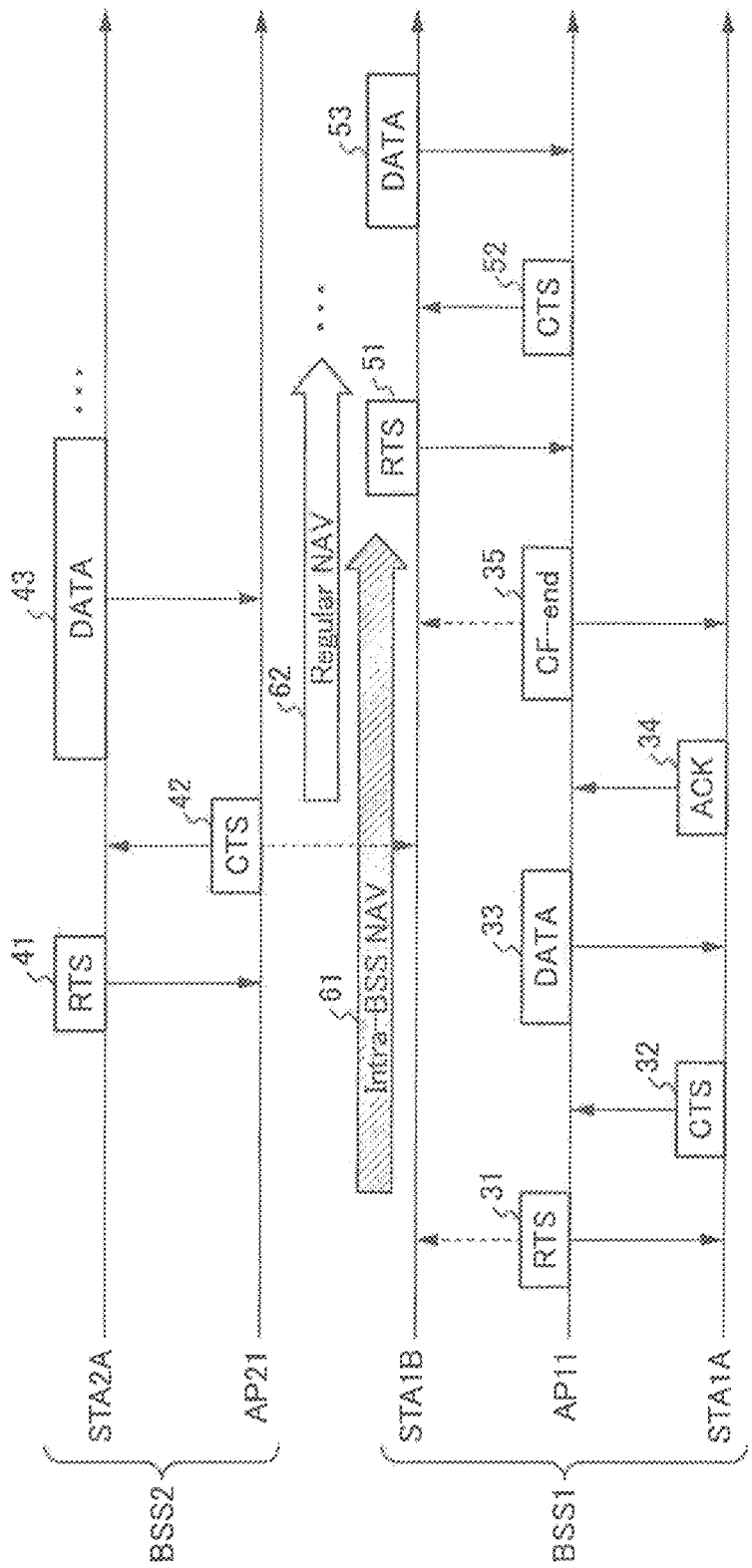
FIG. 8 is a diagram showing a second sequence example according to the present embodiment.

A sequence example of a wireless communication system in which a terminal operates according to the flowchart in FIG. 7. FIG. 8 shows a second example of a sequence to be performed by the wireless communication system. In the aforementioned sequence in FIG. 6, operations of the terminal 1B managing two NAVs (an Intra-BSS NAV and a Regular NAV) have been described. In FIG. 8, a sequence in which the terminal 1B performs DSC and transmission is added to the sequence in FIG. 6. Explanations overlapping those in FIG. 6 are omitted. The sequence in FIG. 8 will be described below, with reference to the flowchart in FIG. 7.

Operations to the point at which the terminal 1B sets the Intra-BSS NAV 61 and the Regular NAV 62 are same as those in FIG. 6. The terminal 1B has data to be transmitted to the access point 11, but does not perform a back-off process while the Intra-BSS NAV 61 is set. The terminal 1B waits for the Intra-BSS NAV 61 to be canceled by the elapse of time (S102 in FIG. 7). When the Intra-BSS NAV 61 is canceled, the terminal 1B starts a back-off process for acquiring an access right by ignoring, at this time point, the Regular NAV 62 which is still set. In the back-off process, whether a frame or a signal the level of which is equal to or greater than an initial CCA threshold has been received during the carrier sensing is determined. Although the data frame 43 has been transmitted from the terminal 2A, the terminal 1B determines that the reception level of the data frame 43 is less than the initial CCA threshold (NO at S105 in FIG. 7). The terminal 1B determines that a wireless medium is idle, acquires an access right, and transmits an RTS frame 51 (S109). It is assumed that, in the middle of reception of the data frame 43, the terminal 1B can determine that the sender thereof is in the OBSS, from color information stored in the header of the packet. The access point 11 transmits a CTS frame 52 in response to the RTS frame 51. The terminal 1B transmits a data frame 53 including data to be transmitted to the access point 11.

A case where the reception level, at the terminal 1B, of the data frame 43 transmitted from the terminal 2A is less than the initial CCA threshold has been described. If the reception level is equal to or greater than the initial CCA threshold (YES at S105), the sequence is as follows. The terminal 1B determines whether the sender of the data frame 43 is in the OBSS or not (S106 in FIG. 7). The terminal 1B determines whether the sender is in the OBSS or not by any one of the first to fourth methods. For example, the second method is used, the determination is performed on the basis of color information included in the packet header of the data frame 43. The terminal 1B determines that the data frame 43 is a frame transmitted from the OBSS (YES at S106). The terminal 1B determines whether the reception level of the data frame 43 is less than the OBSS CCA threshold (which is greater than the initial CCA threshold) or not. In this case, the terminal 1B determines that the reception level of the data frame 43 is less than the OBSS CCA threshold (YES at S108), and the terminal 1B determines that the wireless medium is idle, acquires an access right, and transmits the RTS frame 51 (S109).

Figure 9:
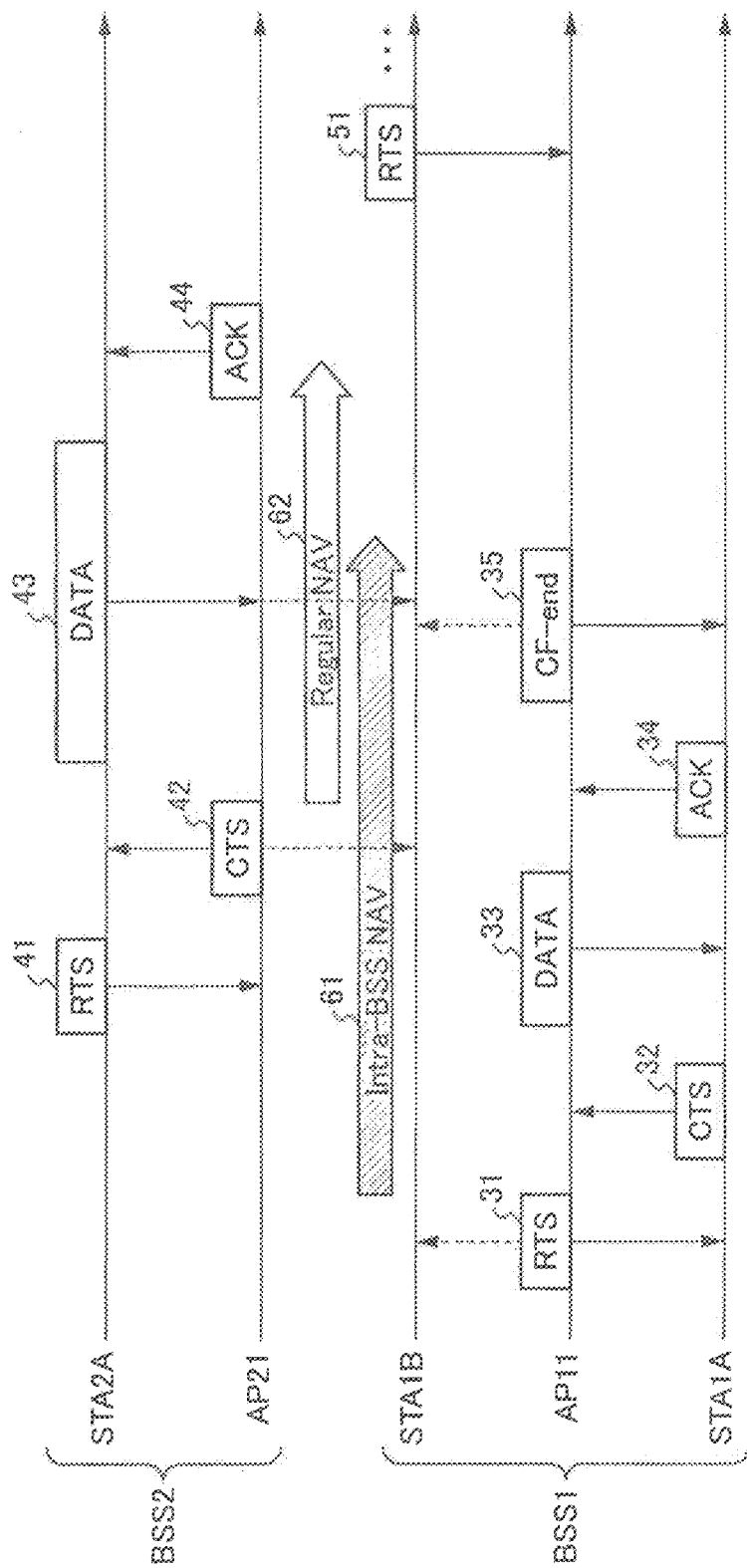
FIG. 9 is a diagram showing a third sequence example according to the present embodiment.

Operations in a case where the terminal 1B determines that the reception level of the data frame 43 is equal to or greater than the OBSS CCA threshold (NO at S108), will be described below. FIG. 9 shows a sequence example (a third sequence example) of this case. In the drawing, the dotted line extending in the time axis from the data frame 43 to the STA 1B indicates that the reception level, at the terminal 1B, of the data frame 43 is equal to or greater than the OBSS CCA threshold. In this case, the terminal 1B waits for the wireless channel to become idle (S107). That is, the terminal 1B waits until a signal the reception level of which is equal to or greater than the OBSS CCA threshold is not received any more. When the wireless channel becomes idle, the operations of the flow in FIG. 7 may be started again. In the example in FIG. 9, the access point 21 transmits an ACK frame 44 in response to the data frame 43. At this time point, the terminal 1B cancels the Regular NAV 62 because the period of the Regular NAV 62 is the end of the ACK frame 44. The terminal 1B starts a back-off process, and does not receive a frame or a signal the reception level of which is equal to or greater than the initial CCA threshold (NO at S105), and thus, acquires an access right (S109) and transmits the RTS frame 51.

Figure 10:
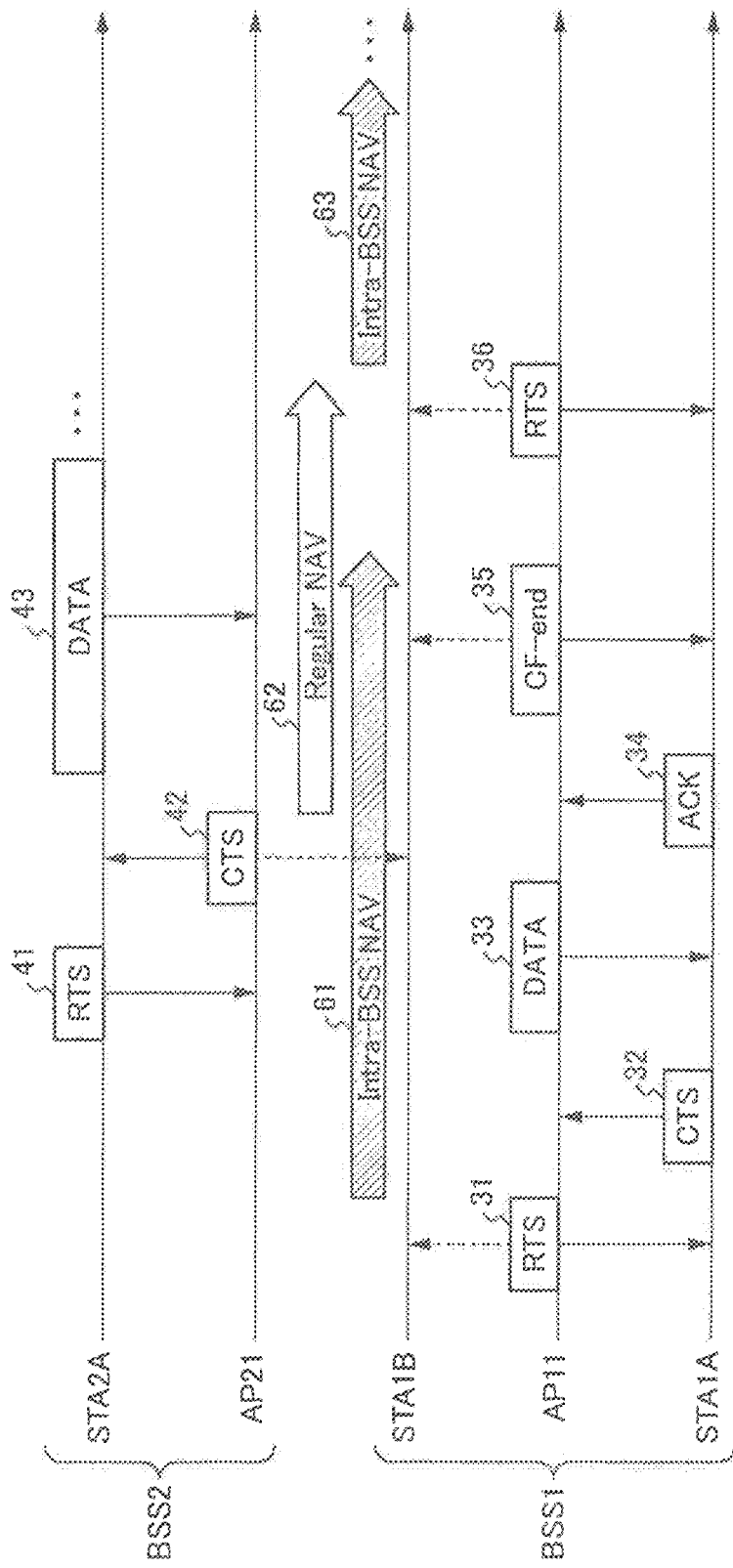
FIG. 10 is a diagram showing a fourth sequence example according to the present embodiment.

A description will be given of operations to be performed in a case where, in the sequence shown in FIG. 8, an RTS frame 36 addressed to the terminal 1A is received from the access point 11 in the own BSS 1 during the Regular NAV 62 (in which it is assumed that the Intra-BSS NAV has ended) (NO at S106). FIG. 10 shows a sequence example (a fourth sequence example) of this case. The terminal 1B receives the RTS frame 36 at a reception level equal to or greater than the initial CCA threshold (YES at S105), but does not perform DSC because the RTS frame 36 has been transmitted from the own BSS 1, that is, not from the OBSS (NO at S106). The terminal 1B waits for the wireless channel to become idle (S107). At this time, the terminal 1B sets the Intra-BSS NAV 63 again on the basis of a value set in the Duration/ID field of the RTS frame 36, and waits at least for the Intra-BSS NAV 63.

Figure 11:
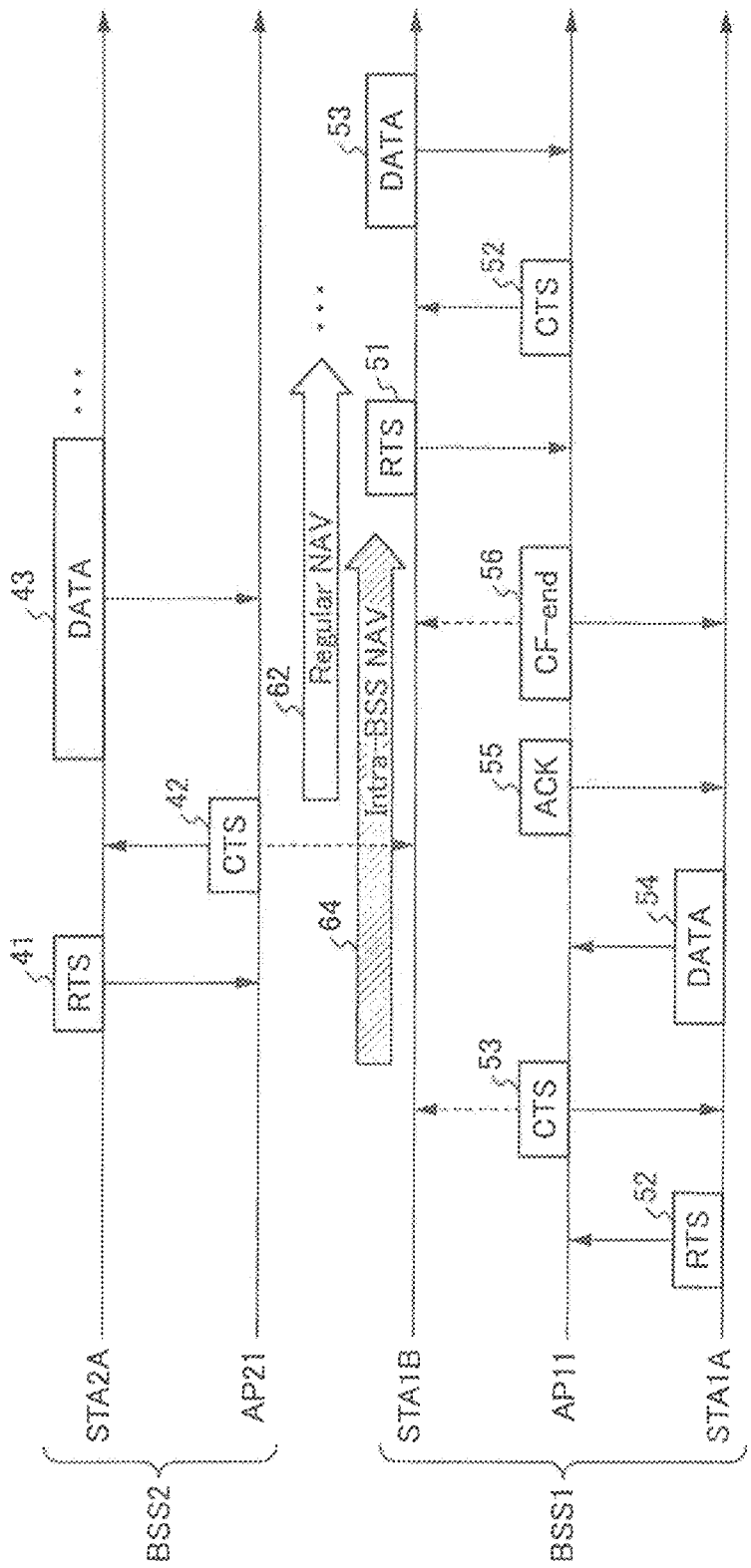
FIG. 11 is a diagram showing a fifth sequence example according to the present embodiment.

Next, a sequence example will be described which includes operations of setting an Intra-BSS NAV by determining that the sender of a CTS frame is in an own BSS by the aforementioned third or fourth method. FIG. 11 shows a sequence example (a fifth sequence example) of this case. The terminal 1A in the BSS 1 transmits an RTS frame 52, and the access point 11 receives the RTS frame 52. The terminal 1B does not receive the RTS frame 52 (the reception level is less than the initial CCA threshold). After elapse of the SIFS since completion of reception of the RTS frame 52, the access point 11 transmits a CTS frame 53. The RA of the CTS frame 53 is the MAC address of the terminal 1A, and the CTS frame 53 lacks a TA. The CTS frame 53 is received by not only the terminal 1A but also the terminal 1B. After elapse of the SIFS since reception of the CTS frame 53, the terminal 1A transmits a data frame 54 to the access point 11. On the other hand, the terminal 1B sets a NAV on the basis of a value set in the Duration/ID field of the CTS frame 53. At this time, the terminal 1B determines whether the sender of the CTS frame 53 is in the own BSS 1 or in the OBSS by the aforementioned third or fourth method. In a case where the third example is used, for example, the terminal 1B holds the TA of a frame previously transmitted from the access point 11 but addressed to a separate terminal (it is known from the TA of the frame that the sender of the frame is the access point 11), and the terminal 1B determines whether or not the TA of the received CTS frame 53 matches the held TA. Here, the TA of the CTS frame 53 matches the held TA, and thus, the terminal 1B determines that the sender of the CTS frame 53 is in the own BSS 1. Accordingly, the terminal 1B sets the Intra-BSS NAV 64 as a NAV. The access point 11 having succeeded in receiving the data frame 54 transmits an ACK frame 55 after elapse of the SIFS since the reception, and further transmits a CF-End frame 56 after elapse of SIFS since the transmission. The CF-End frame 56 may not be transmitted. Since the terminal 1B sets the Intra-BSS NAV 64 according to the CTS frame 53, the terminal 1B does not perform a back-off process at least until the end of the Intra-BSS NAV 64 in accordance with the operations of the aforementioned flowchart in FIG. 7. Operations other than the above are same as those in FIG. 8, and thus, the explanation thereof is omitted.

Figure 12:
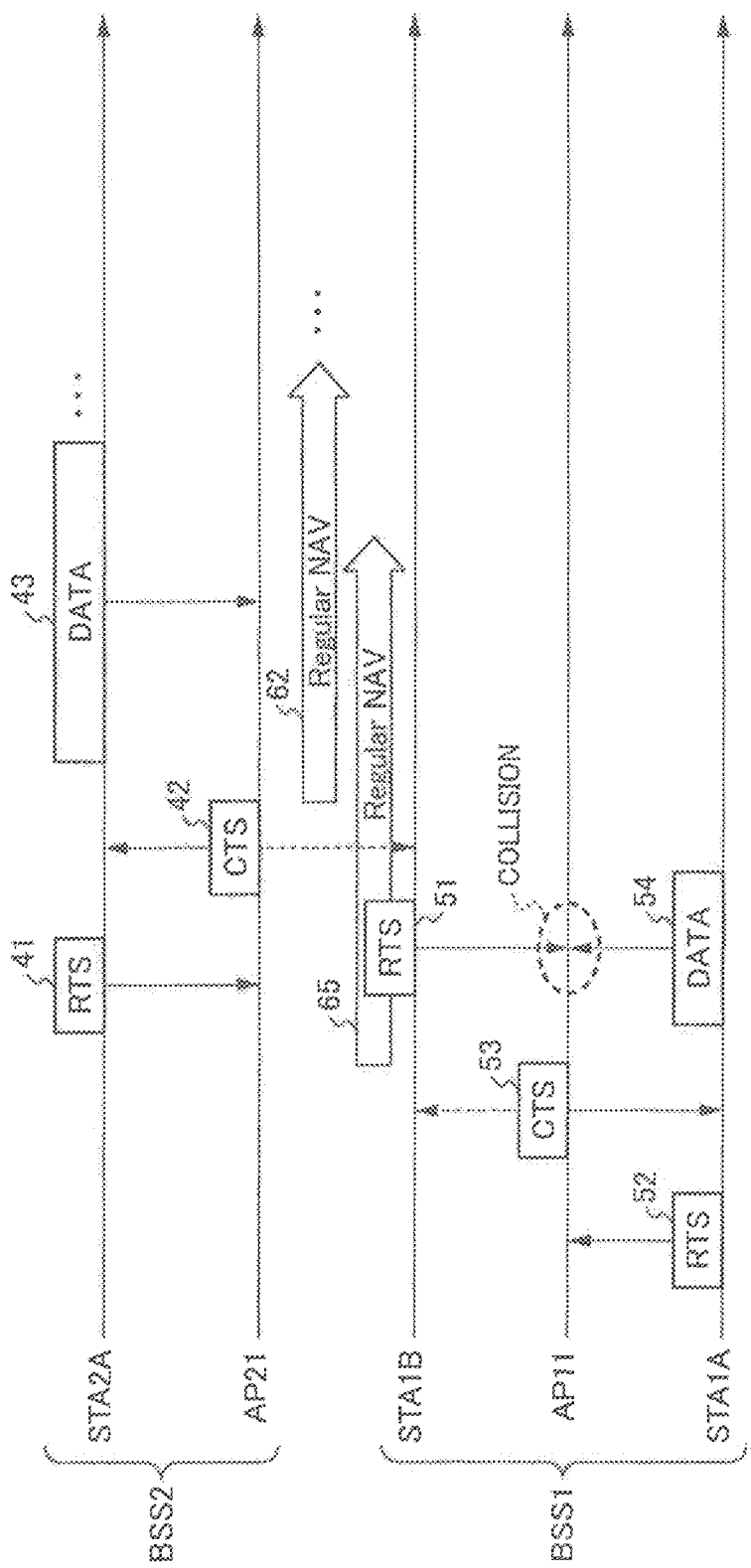
FIG. 12 is a diagram showing a sixth sequence example according to the present embodiment.

The terminal 1B might fail to perform any of the first to fourth methods, and thus, determination on whether the sender of the CTS frame 53 is in the own BSS or in the OBSS might be failed. This case will be considered (the same applies for a case where any of the first to fourth methods is performed but the sender is unknown). In the aforementioned case where the determination is failed, a Regular NAV may be set as a NAV. FIG. 12 shows a sequence example (a sixth sequence example) in which a Regular NAV is set in the aforementioned case. The terminal 1B receives the CTS frame 53 but does not find whether the sender of the CTS frame 53 is in the own BSS 1 or in the OBSS. Accordingly, the terminal 1B sets the Regular NAV 65. The Regular NAV 65 is set but the terminal 1B ignores the Regular NAV 65 during a period in which Intra-BSS NAV is not set, in accordance with the operations shown in FIG. 7. Although the terminal 1A is transmitting the data frame 54 to the access point 11, the terminal 1B acquires an access right (S109) and transmits the RTS frame 51. As a result, the RTS frame 51 and the data frame 54 collide with each other, and thus, the access point 11 fails to receive the data frame 54. In contrast, in the aforementioned sequence example in FIG. 11, since it is determined that the sender of the CTS frame 53 is in the own BSS 1, the Intra-BSS NAV 64 can be set. Therefore, a problem as in the sequence in FIG. 12 is prevented. In FIG. 12, the example is shown in which the two Regular NAVs 62 and 65 are managed. However, unitary management of Regular NAVs may be performed such that the Regular NAV 65 which has been set in response to reception of the CTS frame 53, is updated in response to the reception of the CTS frame 42.

Figure 13:
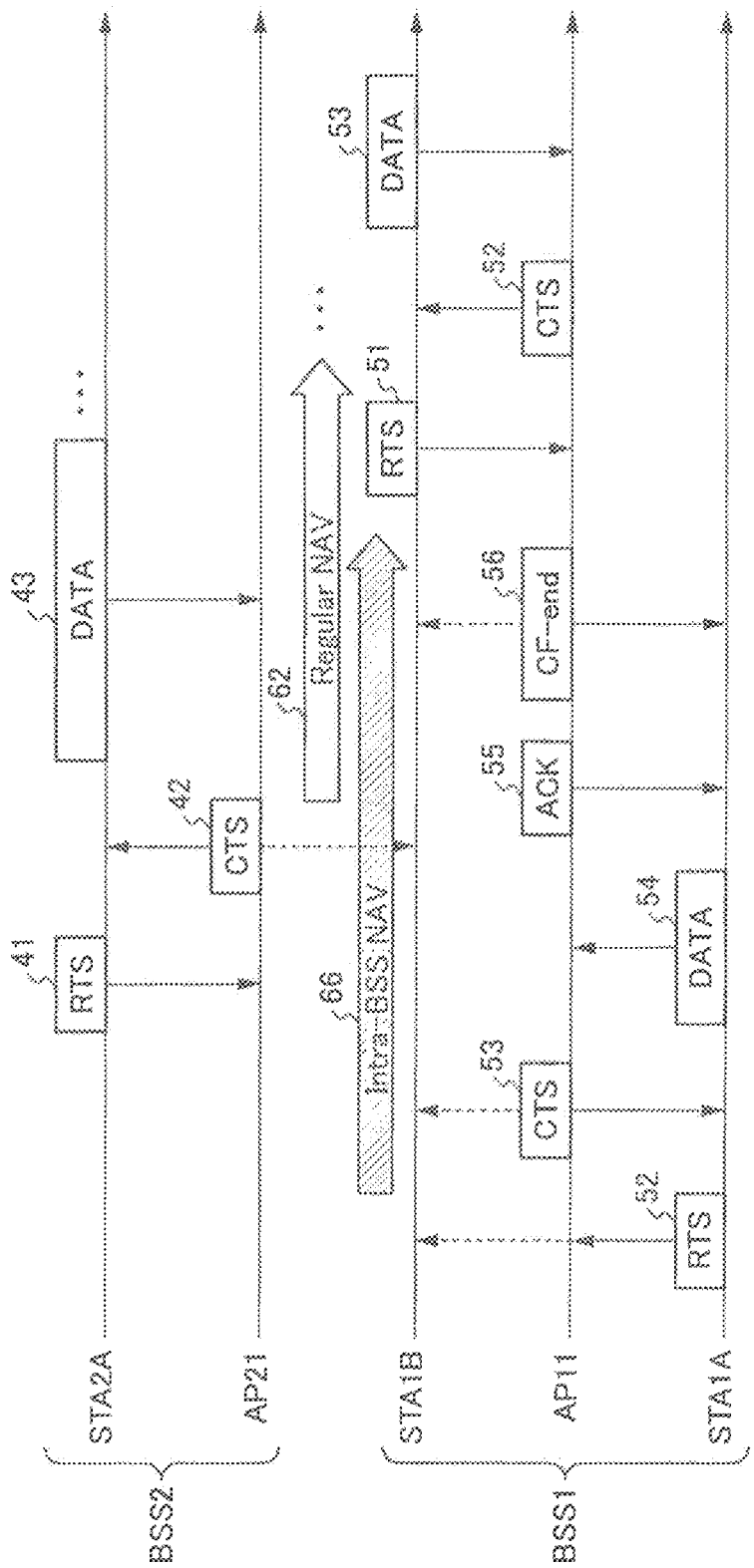
FIG. 13 is a diagram showing a seventh sequence example according to the present embodiment.

In the sequence example in FIG. 12, the terminal 1B fails to receive the RTS frame 52 transmitted from the terminal 1A. However, if a case where the terminal 1B succeeds in receiving the RTA frame 52, the problem as in FIG. 12 can be prevented. A sequence example (a seventh sequence example) of this case is shown in FIG. 13. The terminal 1B receives the RTS frame 52 and finds, from the RA of the RTS frame 52, that receiver device of the RTS frame 52 is the access point 11. Thus, the terminal 1B determines that the receiver of RTS frame 52 is in the own BSS 1. Accordingly, the terminal 1B sets the Intra-BSS NAV 66 as an NAV. Since the terminal 1B refrains from performing a transmission operation in a state where the Intra-BSS NAV is set, the collision problem as in FIG. 12 does not occur. The operations other than the above are same as those in FIG. 11, and thus, the explanation thereof is omitted.

In the aforementioned sequence example in FIG. 12, since the terminal 1B sets the Regular NAV 65 according to reception of the CTS frame 53, the terminal 1B performs DSC in accordance with the operations of the flow in FIG. 7. As a result, the terminal 1B acquires an access right and transmits the RTS frame 51, and the RTS frame 51 collides, at the access point 11, with the data frame 54. In the sequence example in FIG. 13, since the RTS frame prior to the CTS frame 53 has been received, the above problem can be prevented. A method for solving the problem in a different way from that in FIG. 13 will be described below.

Figure 14:
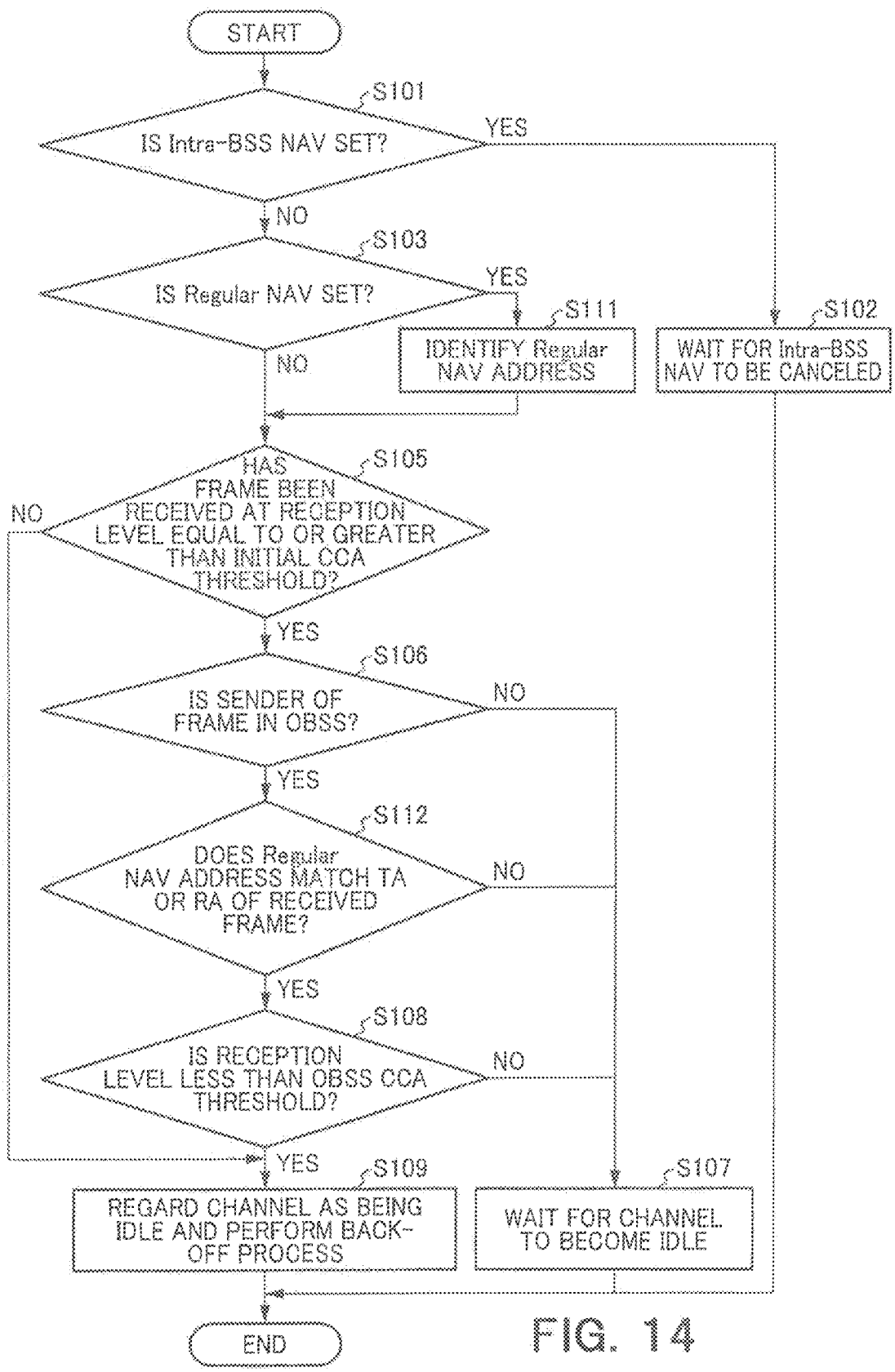
FIG. 14 is a flowchart of another operation example of the terminal according to the present embodiment.

FIG. 14 is a flowchart of other operations of the terminal according to the present embodiment. Step S104 in FIG. 7 is replaced with Step S111, and Step S112 is added between Step S106 and Step S108.

When it is determined at Step S103 that the Regular NAV is set, the Regular NAV address thereof is identified at Step S111. A Regular NAV address is the address of a frame which has caused the current Regular NAV to be set. Specifically, a Regular NAV address is the RA and TA of such a frame, or the RA of the frame if the TA is lacked (hereinafter, referred to as "RA/TA").

For example, if a frame which has caused a Regular NAV is a CTS frame, the RA of the CTS frame corresponds to the Regular NAV address (the same applies for a case where the sender of the CTS frame is actually in the own BSS but is determined as being unknown, and a Regular NAV is accordingly set).

In a case where, subsequent to a CTS frame, another frame (for example, an RTS frame from the OBSS) is received, and a Regular NAV is accordingly updated, the address (RA/TA) of the frame is also identified. In a case where not unitary management but individual management of Regular NAVs are performed, for each of currently set Regular NAVs, the addresses of a frame which has caused the Regular NAV is identified.

It is determined that the sender of the frame is in the OBSS at Step S106, the flow proceeds to Step S112. The address (RA/TA) of the newly received frame (for example, a data frame) is compared with the Regular NAV address to determine whether the address (RA/TA) matches the Regular NAV address. When the address (RA/TA) matches the Regular NAV address, DSC is performed (S108, S109). When the address (RA/TA) does not match the Regular NAV address, DSC is not performed (S108). For example, in a case where there are three Regular NAV addresses, when two of them match either the RA or TA address of the newly received frame but the remaining one does not match either the RA or TA, DSC is not performed.

Figure 15:
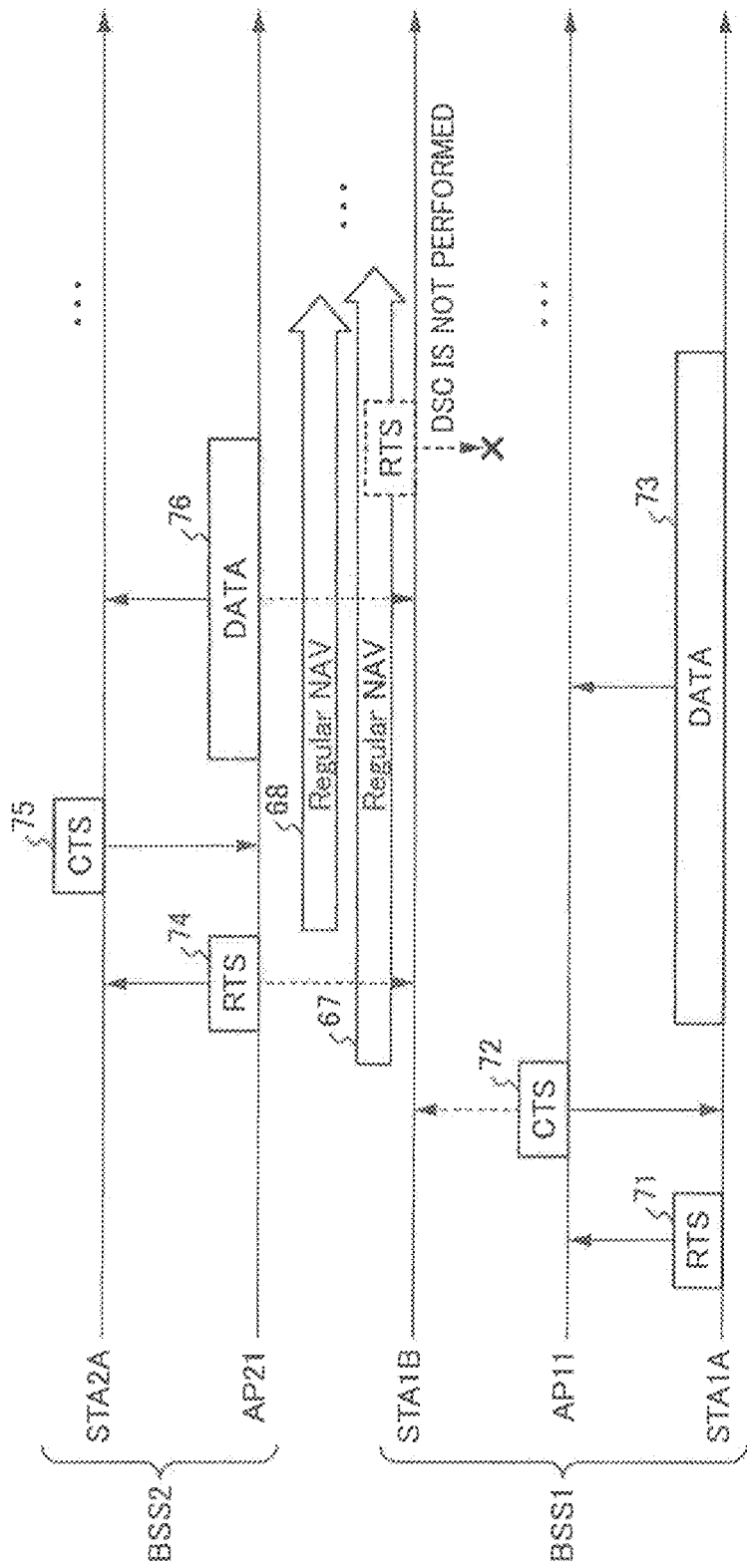
FIG. 15 is a diagram showing an eighth sequence example according to the present embodiment.

FIG. 15 shows a sequence example (an eighth sequence example) for providing a specific example of the operations in FIG. 14.

The terminal 1A in the BSS 1 transmits an RTS frame 71, and an access point 72 transmits a CTS frame 72 in response to the RTS frame 71. The CTS frame 72 is received by the terminal 1A and the terminal 1B. After elapse of the SIFS since completion of reception of the CTS frame 72, the terminal 1A transmits a data frame 73. The terminal 1B determines that whether the sender of the CTS frame 72 is in the own BSS or in the OBSS is not found, and sets a Regular NAV 67 on the basis of a value set in the Duration/ID field of the CTS frame 72.

On the other hand, the access point 21 in the BSS 2 transmits an RTS frame 74, and the RTS frame 74 is received not only by the terminal 2A but also by the terminal 1B in the BSS 1. In response to the RTS frame 74, the terminal 2A transmits a CTS frame 75. After elapse of the SIFS since completion of reception of the CTS frame 75, the access point 21 transmits a data frame 76. The data frame 76 is received not only by the terminal 2A but also by the terminal 1B.

The terminal 1B determines that the sender of the RTS frame 74 is in the OBSS because neither the RA nor TA of the RTS frame 74 is the BSSID (the MAC address of the access point 11) of the own BSS 1. Accordingly, the terminal 1B sets a Regular NAV 68 on the basis of a value set in the Duration/ID field of the RTS frame 74.

Before or during reception of the data frame 76 by the terminal 1B from the access point 21, data to be transmitted to the access point 11 may be generated and a request for transmission of an RTS frame may be generated. In this case, in order to acquire an access right, the terminal 1B performs processing in accordance with the operations in FIG. 14. In the flow in FIG. 14, an Intra-BSS NAV is not set (NO at S101), but the Regular NAV is set, and thus, Regular NAV addresses are identified (S111).

The Regular NAV addresses are the RA (the MAC address of the terminal 1A) of the CTS frame 72 which has caused the Regular NAV 67 and the TA and RA (the MAC address of the access point 21 and the MAC address of the terminal 2A) of the RTS frame 74 which has caused the Regular NAV 68.

The data frame 76 is received at a level equal to or greater than the initial CCA threshold (YES at S105), and it is determined, from, e.g., BSS color information in the packet header, that the sender of the data frame 76 is in the OBSS (YES at S106). The terminal 1B determines whether each of the Regular NAV addresses matches either the TA or the RA of the data frame 76 (S112).

The TA and RA of the data frame 76 are the MAC address (BSSID) of the access point 21 and the MAC address of the terminal 2A, respectively. Therefore, the MAC address of the terminal 1A, which is one of the Regular NAV addresses does not match any of the TA and RA of the data frame 76 (NO at S112).

Accordingly, the terminal 1B waits for the channel to become idle, without performing DSC (S107). As a result, transmission of an RTS frame from the terminal 1B is prohibited (see the RTS surrounded by the dotted line frame in FIG. 15). If the terminal 1B transmits an RTS frame, the RTS frame collides with the data frame 73 transmitted from the terminal 1A. However, control is performed so as not to perform DSC due to address mismatch, and thereby, the collision problem can be prevented.

Modifications of the operations according to the flowchart in FIG. 14 will be described below.

(First Modification)

In the flowchart in FIG. 14, when a frame which has caused a Regular NAV has a TA and a RA, both of the TA and the RA are held as Regular NAV addresses, and used for comparison at Step S112. In another method, only the RA is held and used for comparison. In the sequence example in FIG. 15, of the TA and the RA of the RTS frame 74, only the RA may be held whereas the TA needs not to be held.

(Second Modification)

The process at Step S112 may be modified such that the number of Regular NAV addresses is counted, and it is determined that DSC is not to be performed when the number is three or more, and that DSC is to be performed when the number is two or less.

(Third Modification)

In a case where there are two or more OBSSs and Regular NAVs are set for the plurality of OBSSs, a Regular NAV address is held for each OBSS. The process at Step S112 may be expanded such that when the address matching condition is not satisfied for any one of the OBSSs at Step S112, DSC is not performed.

(Fourth Modification)

The process at Step S112 may be modified such that it is determined that DSC is not to be performed when another Regular NAV is added (the Regular NAV is updated in a case where unitary management of Regular NAVs are performed) in the middle of a Regular NAV. In the example in FIG. 15, the Regular NAV 68 is set due to the RTS frame 74, in the middle of the Regular NAV 67 set due to the CTS frame 72. Accordingly, it is determined that DSC is not to be performed.

(Fifth Modification)

The process at Step S112 may be modified such that when a frame which has caused a Regular NAV is a CTS frame, DSC is not performed, and otherwise, DSC is performed. In the example in FIG. 15, since the frame which has caused the Regular NAV 67 is the CTS frame 72, it is determined that DSC is not to be performed. According to this method, even when a Regular NAV is set by reception of only a CTS frame from the OBSS, DSC is not performed. Accordingly, opportunities of interference to the own BSS can be reduced, and effects due to DSC becomes difficult to be obtained.

Figure 16:
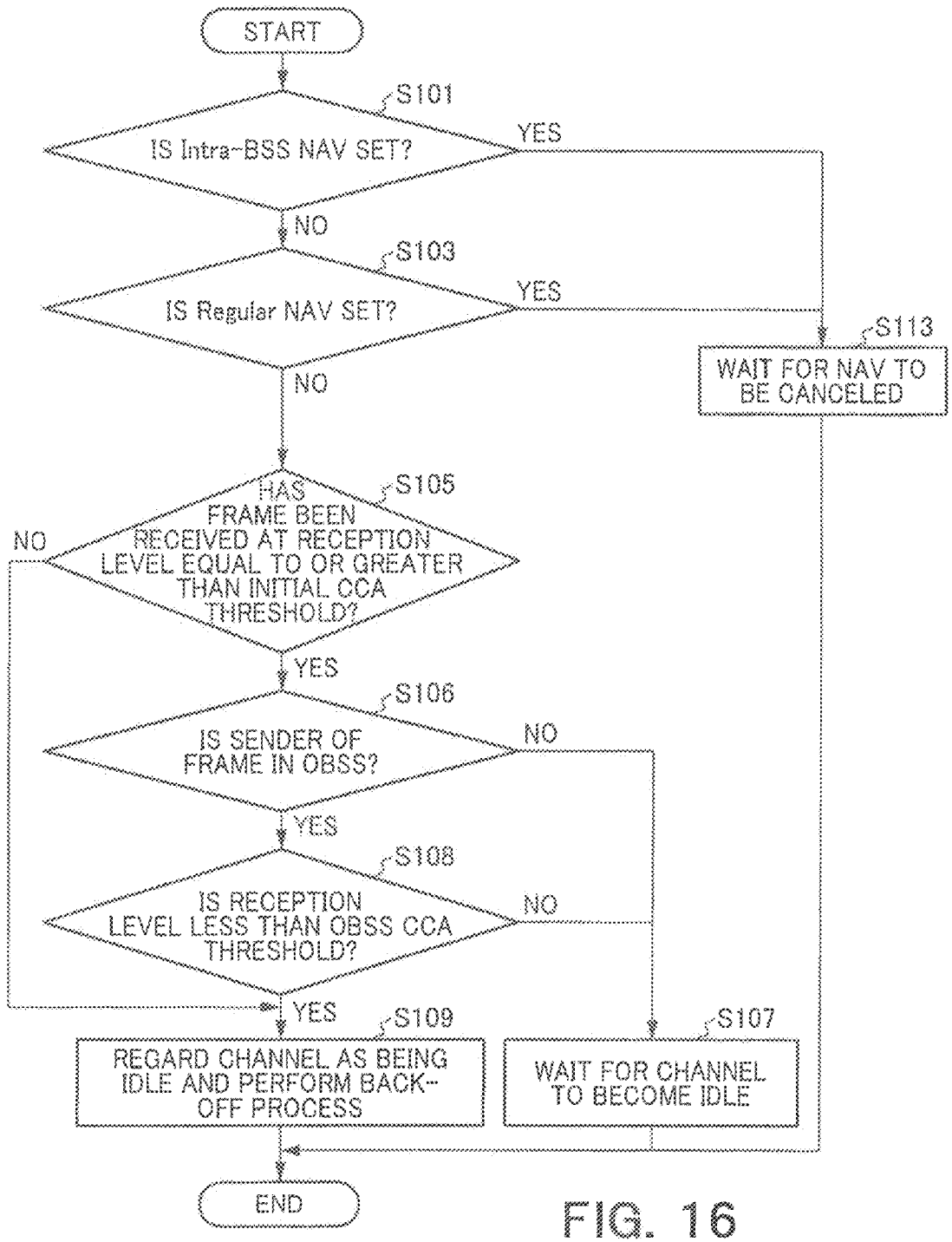
FIG. 16 is a flowchart of still another operation example of the terminal according to the present embodiment.

FIG. 16 is a flowchart of still another operation example of the terminal according to the present embodiment. In FIG. 16, Step S104 in FIG. 7 is deleted, and when it is determined that a Regular NAV is set (YES at S103), cancel of the Regular NAV is waited (S113). In the flowcharts described above, a Regular NAV is ignored. However, in the operation flow in FIG. 16, not only when an Intra-BSS NAV is set but also when a Regular NAV is set, cancel of the NAV is waited. The other operations are same as those in FIG. 7. In this example, an Intra-BSS NAV and a Regular NAV are not distinguished from each other (an Intra-BSS NAV and a Regular NAV are regarded as having the same priority).

Figure 17:
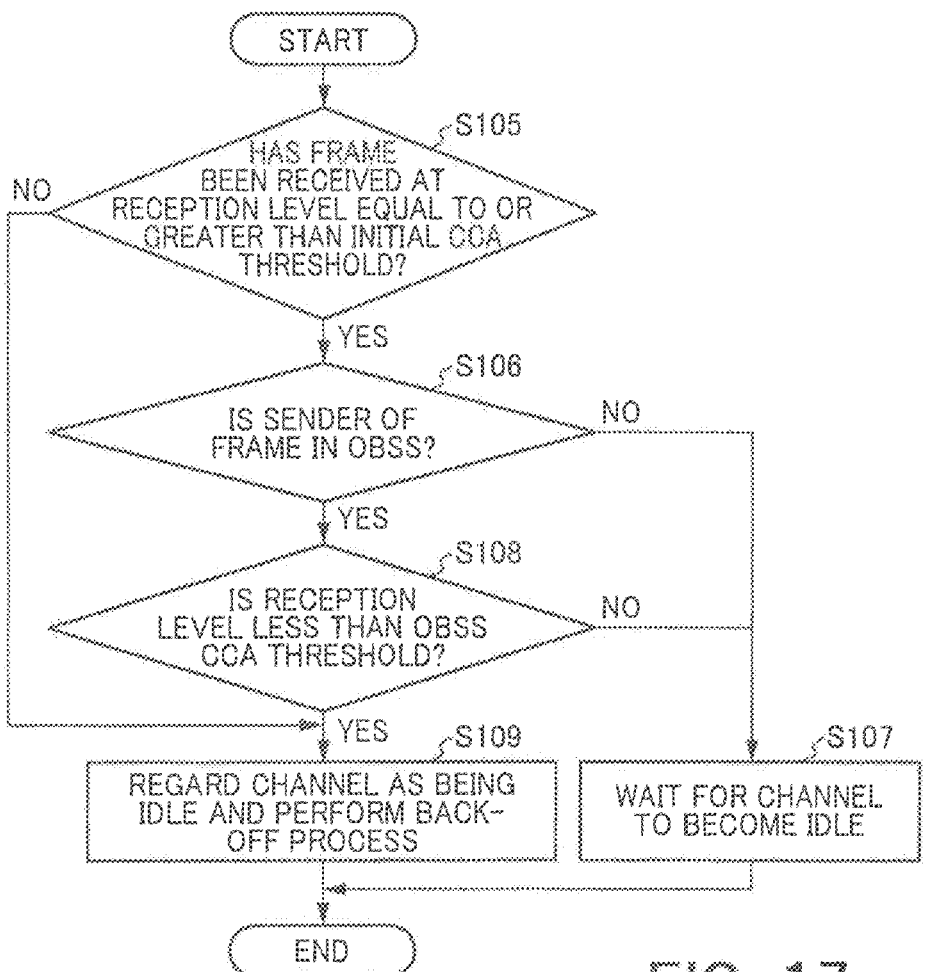
FIG. 17 is a flowchart of yet another operation example of the terminal according to the present embodiment.

FIG. 17 is a flowchart of yet another operation example of the terminal according to the present embodiment. In FIG. 17, Steps S101 to S104 in FIG. 7 are deleted. Even if an Intra-BSS NAV and/or a Regular NAV is set, the set NAV is ignored and DSC is preferentially performed.

Figure 18:
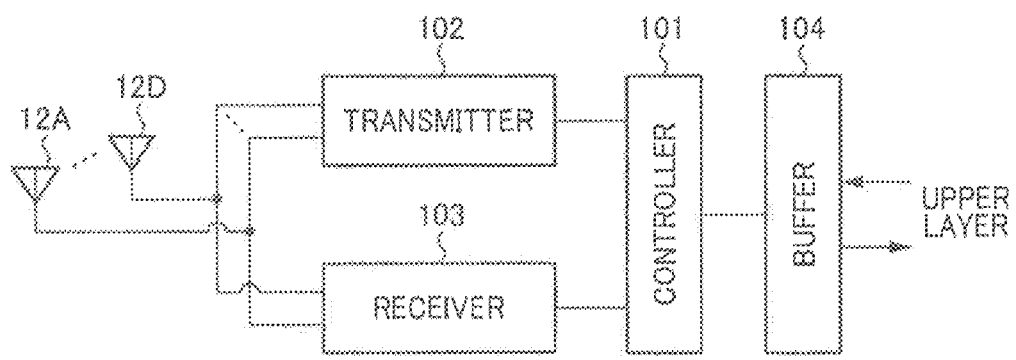
FIG. 18 is a block diagram of a wireless communication device installed in an access point according to the present embodiment.

FIG. 18 is a function block diagram of a wireless communication device installed in the access point 11 according to the present embodiment.

The wireless communication device in the access point includes a controller 101, a transmitter 102, a receiver 103, antennas 12A, 12B, 12C and 12D, and a buffer 104. The number of the antennas is four although the number may be one or more. The controller 101 corresponds to controller which controls communication with the terminals, and the transmitter 102 and the receiver 103 form a wireless communicator which transmits and receives frames via the antenna as an example. A process of the controller 101, and all or a part of a digital region process of the transmitter 102 and the receiver 103 may be performed by software (program) executing on a processor such as a CPU, or may be performed by hardware, or may be performed by the both of software and hardware. The access point may include a processor performing the process of the controller 101, all or a part of the transmitter 102 and the receiver 103.

The buffer 104 is a storage for transferring a frame such as the data frame between an upper layer and the controller 101. The buffer 104 may be a volatile memory such as a DRAM or a non-volatile memory such as a NAND, or an MRAM. The upper layer may perform an upper communication process than a MAC layer such as a TCP/IP or a UDP/IP. The upper layer may store the frame received from another network in the buffer 104 for relaying to the network in the terminal 1A and 2B side. The controller 101 may pass data received from the network in the terminal 1A and 2B side to the upper layer via the buffer. Alternatively, the TCP/IP or a UDP/IP may be performed in the controller 101 and the upper layer may also perform an application layer processing on data of more upper protocol that the TCP/IP or the UDP/IP. An operation of the upper layer may be performed by software (program) processing by a processor such as a CPU, or may be performed by hardware, or may be performed by the both of the software and the hardware.

The controller 101 mainly performs a process of the MAC layer, a part of a process of a physical layer. The controller 101 transmits and receives the frames (specifically, packets each including the frame and a physical header attached to the frame) via the transmitter 102 and the receiver 103 to control the communication with the terminals. The controller 101 may also control so as to periodically transmit a beacon frame for notifying attribute information and synchronization information etc. on BSS (Basic Service Set) of the access point. The controller 101 may include a clock generator generating a clock and may manage an internal time using the clock generated by the clock generator. The controller 101 may output externally the clock created by the clock generator. Alternatively, the controller 101 may be configured to receive the clock externally input and manage an internal time using the clock externally input.

The controller 101, on receiving an association request from the terminal, performs an association process to exchange required information on capability or an attribute etc. each other and establishes the wireless link with the terminal. In a case of success on the association process, the controller 101 assigns an AID which is an identifier for identifying the terminal belonging to the BSS, to the terminal and transmits an association response including the effect of success on the association process (Status field "0", i.e., success) and the AID. The controller 101 may perform a process such as an authentication process with the terminal if necessary previously.

The controller 101 periodically checks the buffer 104 to confirm the state of the buffer 104 such as existence or non-existence of data addressed to the terminal. Alternatively, the controller 101 may check the buffer 104 according to a trigger given from an external device.

The controller 101 performs control such that a frame is transmitted at timing when an access right to a wireless medium is acquired in accordance with CSMA/CA, a predetermined timing, or the like. To transmit a data frame, etc., an RTS frame is first transmitted, and when a CTS frame is received from a device that has received the RTS frame, the data frame, etc. may be transmitted. In the Duration/ID field of the MAC header of a frame (a data frame, an RTS frame, a CTS frame, an ACK frame, or the like) to be transmitted, a value corresponding to a medium reservation period is set.

The controller 101 transmits the generated frame using the transmitter 102 via the wireless channel to be used (for example, 20 MHz channel width). The transmitter 102 adds a physical header to the input frame and performs coding and modulation process, and performs the modulated physical packet to DA conversion, a filtering process to extract components of a desired band, frequency conversion (up-conversion) and the like to amplify signals obtained through these processes by a pre-amplifier and radiate the amplified signals as radio waves from the plural antennas into the space.

The signal received by the antenna 12 is input to the receiver 103. The received signal is amplified by a low noise amplifier (LNA), is subjected to frequency conversion (down-convert), and is subjected to a filtering process, thereby allowing a desired band component to be extracted. The extracted signal is further converted into a digital signal through AD conversion and is then subjected to demodulation and error correction decoding and processing on the physical header, and a resultant frame is input to the controller 101. The controller 101 carries out CRC check of the frame and determines whether there is an error in the frame. When the frame requires an acknowledgement response, the controller 101 controls to transmit an acknowledgement response frame (AC frame or BA frame etc.) according to the result of CRC check.

A selector for switching connection of the antenna 12 between the transmitter 102 and the receiver 103 may be provided such that the connection of the antenna 12 is switched on the basis of whether transmission is performed or reception is performed.

Here, the controller 101 manages an Intra-BSS NAV and a Regular NAV. The controller 101 may perform unitary management of Intra-BSS NAVs, or may perform individual management of Intra-BSS NAVs every time a frame to cause an Intra-BSS NAV is received. Similarly, the controller 101 may perform unitary management of Regular NAVs, or may perform individual management of Regular NAVs every time a frame to cause a Regular NAV is received. An Intra-BSS NAV corresponds to a transmission prohibition period for an own BSS, and a Regular NAV corresponds to a transmission prohibition period for an OBSS. Further, the controller 101 controls execution of DSC according to the setting state of an Intra-BSS NAV and a Regular NAV, and to the network to which the sender of a received frame addressed to a separate terminal belongs. An example of a method for controlling execution of DSC, an example of a method for setting an Intra-BSS NAV and a Regular NAV, and an example of a method for determining a network (BSS) to which a frame sender belongs have been described with reference to the flowcharts in FIGS. 7, 14, 16, and 17 and the sequences in FIGS. 8 to 13 and 15.

The controller 101 may access a storage that stores therein information to be notified to terminals by a frame, etc., information notified from terminals, or both thereof, to read out the information. The storage may be an internal memory or may be an external memory, and may be a volatile memory or may be a non-volatile memory. Alternatively, the storage may be not a memory but an SSD, a hard disk, or the like.

The above described isolation of the processes of the controller 101 and the transmitter 102 is an example, and another form may be used. For example, the controller 101 may perform the process until the digital region process and the DA conversion, and the transmitter 102 may perform process subsequent to the DA conversion. As for the isolation of the processes of the controller 101 and the receiver 103, similarly, the receiver 103 may perform the process before the AD conversion and the controller 101 may perform the digital region process including processes following the AD conversion. Isolation other than those described above may be used. As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

Figure 19:
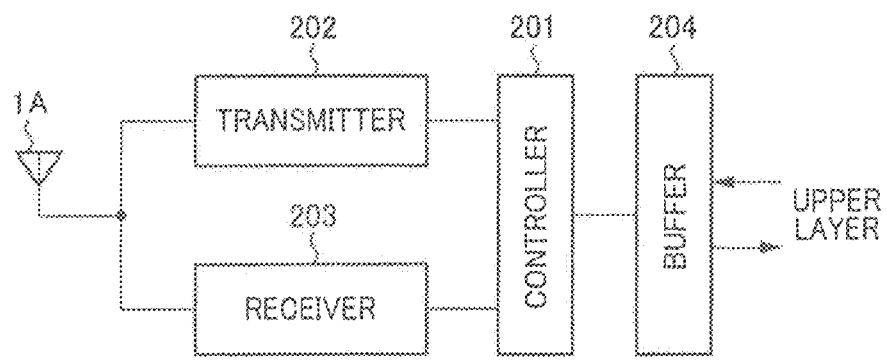
FIG. 19 is a block diagram of a wireless communication device installed in a terminal according to the present embodiment.

FIG. 19 is a function block diagram of a wireless communication device installed in a terminal according to the present embodiment. The wireless communication device basically has same functions, except for the function related to relaying, as those of the access point having been described with reference to FIG. 18.

The wireless communication device includes a controller 201, a transmitter 202, a receiver 203, at least one antenna 1, and a buffer 204. The controller 201 corresponds to a controller which controls communication with the access point 11, and the transmitter 202 and the receiver 203 form a wireless communicator which transmits and receives frames as an example. A process of the controller 201, and all or a part of a digital region process of the transmitter 202 and the receiver 203 may be performed by software (program) executing on a processor such as a CPU, or may be performed by hardware, or may be performed by the both of the software and the hardware. The terminal may include a processor performing the process of the controller 201, all or a part of the transmitter 202 and the receiver 103.

The buffer 204 is a storage for transferring data or the like between an upper layer and the controller 201. The buffer 204 may be a volatile memory such as a DRAM or a non-volatile memory such as a NAND, or an MRAM. The upper layer may perform an upper communication process than a MAC layer such as a TCP/IP or a UDP/IP. The upper layer generates data to transmit to as another terminal, access point 11 or a device in another network such a server and stores the data in the buffer 204. The controller 201 may pass data received from another terminal, access point 11 or the device in another network to the upper layer via the buffer 204. The TCP/IP or the UDP/IP may be performed in the controller 201 and the upper layer may perform an application layer processing on the data of more upper layer than the TCP/IP or the UDP/IP. A process of the upper layer may be performed by software (program) executing on a processor such as a CPU, or may be performed by hardware, or may be performed by the both of these software and hardware.

The controller 201 mainly performs a process of the MAC layer. The controller 201 transmits and receives the frames (specifically, packets each including the frame and a physical header attached to the frame) via the transmitter 202 and the receiver 203 to and from the access point to control the communication with the access point. The controller 201 may include a clock generator generating a clock and may manage an internal time using the clock generated by the clock generator. The controller 201 may output externally the clock created by the clock generator. Alternatively, the controller 201 may be configured to receive the clock externally input and manage an internal time using the clock externally input.

The controller 201 receives a beacon frame as an example, to detect the attribute and synchronization information of BSS of the access point 11 and then transmits an association request to the access point 11 to perform an association process in response to the received beacon. Thereby, the controller 201 exchanges required information on capability or an attribute etc. each other and establishes the wireless link with the access point 11. When the association process succeeds, the controller 201 detect the AID assigned to the own terminal based on the association response. The controller 201 may perform a process such as an authentication process if necessary previously.

The controller 201 periodically checks the buffer 204 to grasp a state of the buffer 204 such as whether or not the data for uplink transmission exists. Alternatively, the controller 201 checks the state of the buffer 204 by an external trigger.

When the controller 201 confirms the presence of data for uplink transmission, etc., the controller 201 acquires an access right (a transmission right) to a wireless medium in accordance with CSMA/CA, etc. Subsequently, the controller 201 transmits a frame (a data frame) including the data through the transmitter 202 and the antenna 1A. The controller 201 may transmit the data frame, after transmitting an RTS frame and succeeding in receiving a CTS frame from a device that has received the RTS frame. In the Duration/ID field of the MAC header of a frame (a data frame, an RTS frame, a CTS frame, an ACK frame, or the like) to be transmitted, a value corresponding to a medium reservation period is set.

The controller 201 transmits the generated frame using the transmitter 202 via the wireless channel to be used (for example, 20 MHz channel width). The transmitter 202 adds a physical header to the input frame and performs coding and modulation process, and performs the modulated physical packet to DA conversion, a filtering process to extract components of a desired band, frequency conversion (up-conversion) and the like to amplify signals obtained through these processes by a pre-amplifier and radiate the amplified signals as radio waves from one or plural antennas into the space.

The signal received by the antenna 1A is input to the receiver 203. The received signal is amplified by a low noise amplifier (LNA), is subjected to frequency conversion (down-convert), and is subjected to a filtering process, thereby allowing a desired band component to be extracted. The extracted signal is further converted into a digital signal through AD conversion and is then subjected to demodulation and error correction decoding and processing on the physical header, and a resultant frame is input to the controller 201. The controller 201 carries out CRC check of the frame and determines whether there is an error in the frame. When the frame requires an acknowledgement response, the controller 101 controls to transmit an acknowledgement response frame (AC frame or BA frame etc.) according to the result of CRC check.

Here, the controller 201 manages an Intra-BSS NAV and a Regular NAV. The controller 201 may perform unitary management of Intra-BSS NAVs or may perform individual management of Intra-BSS NAVs every time a frame to cause an Intra-BSS NAV is received. Similarly, the controller 201 may perform unitary management of Regular NAVs, or may perform individual management of Regular NAVs every time a frame to cause a Regular NAV is received. An Intra-BSS NAV corresponds to a transmission prohibition period for an own BSS, and a Regular NAV corresponds to a transmission prohibition period for an OBSS. Further, the controller 201 controls execution of DSC according to the setting state of an Intra-BSS NAV and a Regular NAV, and to the network to which the sender of a received frame addressed to a separate terminal belongs. An example of a method for controlling execution of DSC, an example of a method for setting an Intra-BSS NAV and a Regular NAV, and an example of a method for determining a network (BSS) to which a frame sender belongs have been described with reference to the flowcharts in FIGS. 7, 14, 16, and 17 and the sequences in FIGS. 8 to 13 and 15.

A selector for switching connection of the antenna 1A between the transmitter 202 and the receiver 203 may be provided such that the connection of the antenna 1A is switched on the basis of whether transmission is performed or reception is performed.

The controller 201 may access a storage that stores therein information to be notified to the access point 11, information notified from the access point 11, or both thereof, to read out the information. The storage may be an internal memory or may be an external memory, and may be a volatile memory or may be a non-volatile memory. Alternatively, the storage may be not a memory but an SSD, a hard disk, or the like.

The above described isolation of the processes of the controller 201 and the transmitter 202 is an example, and another form may be used. For example, the controller 201 may perform the process until the digital region process and the DA conversion, and the transmitter 202 may perform process subsequent to the DA conversion. As for the isolation of the processes of the controller 201 and the receiver 203, similarly, the receiver 203 may perform the process before the AD conversion and the controller 201 may perform the digital region process including processes following the AD conversion. Isolation other than those described above may be used. As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

Second Embodiment

Figure 20:
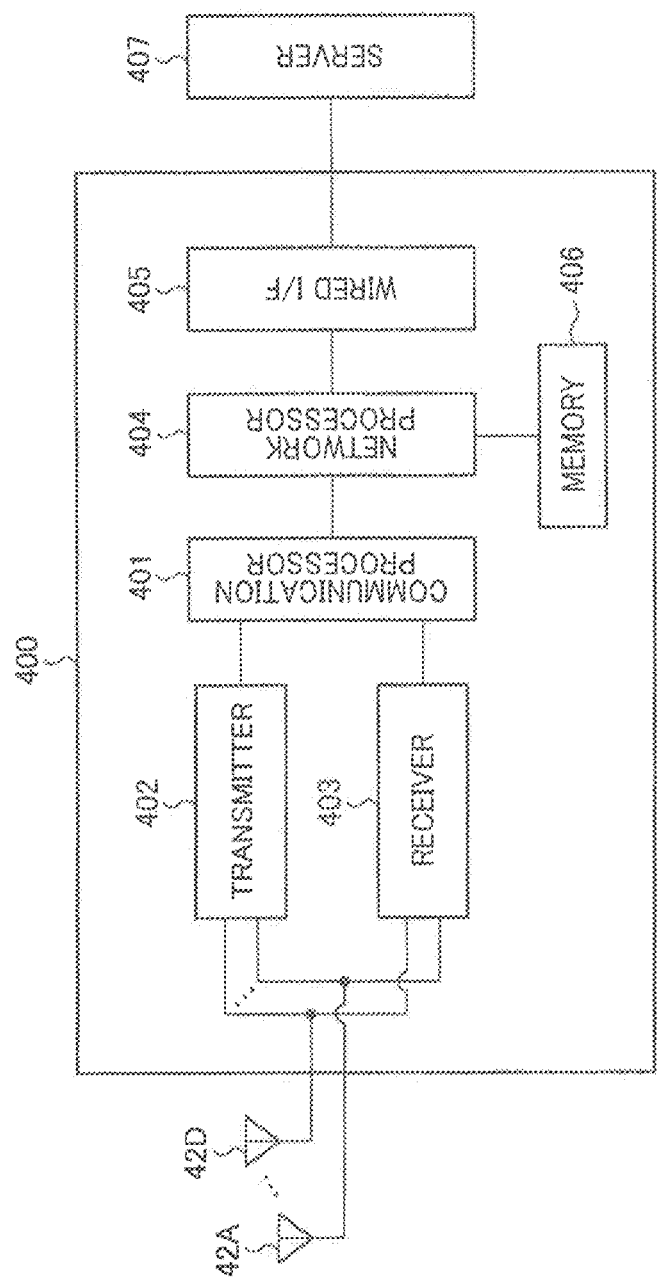
FIG. 20 is a function block diagram of a base station or a terminal according to a second embodiment.

FIG. 20 is a functional block diagram of a base station (access point) 400 according to an eight embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the controller described in the first embodiment. The transmitter 402 and the receiver 403 have functions similar to the WLAN transmitter and the WLAN receiver described in the first embodiment. The network processor 404 has functions similar to the controller and the upper layer processor. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly. In this case, a wireless I/F may be employed instead of the wired I/F 405.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

Information obtained from the frame, the data or the packet received by the base station in the first embodiment may be cached in the memory 406. The frame transmitted by the access point in the first embodiment may include the cached data or information based on the cached data. The information based on the cached data may include information on existence or non-existence of data addressed to the terminal, a size of the data, a size of a packet required for transmission of the data. The information based on the cached data may include a modulation scheme required for transmission of the data.

In the present embodiment, although the base station with the cache function is described, a terminal (STA) with the cache function can also be realized by the same block configuration as FIG. 20. In this case, the wired I/F 405 may be omitted. The terminal described here indicates a non-base station terminal (the base station is one form of a wireless communication terminal as stated above). The transmission, by the terminal, of the frame, the data or the packet used in first embodiment may be carried out based on the cached data stored in the memory 406. Also, information obtained from the frame, the data or the packet received by the terminal in first embodiment may be cached in the memory 406. The frame transmitted by the terminal in the first embodiment may include the cached data or information based on the cached data. The information based on the cached data may include information on existence or non-existence of data addressed to the terminal, a size of the data, a size of a packet required for transmission of the data. The information based on the cached data may include a modulation scheme required for transmission of the data.

Third Embodiment

Figure 21:
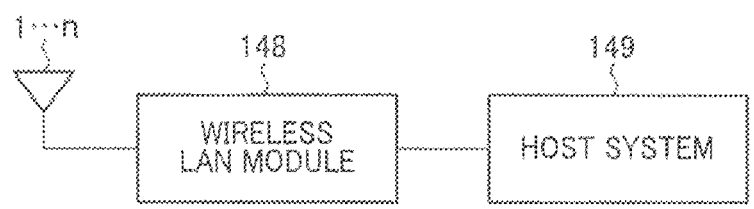
FIG. 21 is a diagram illustrating an overall configuration example of a terminal or a base station according to a third embodiment.

FIG. 21 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 22:
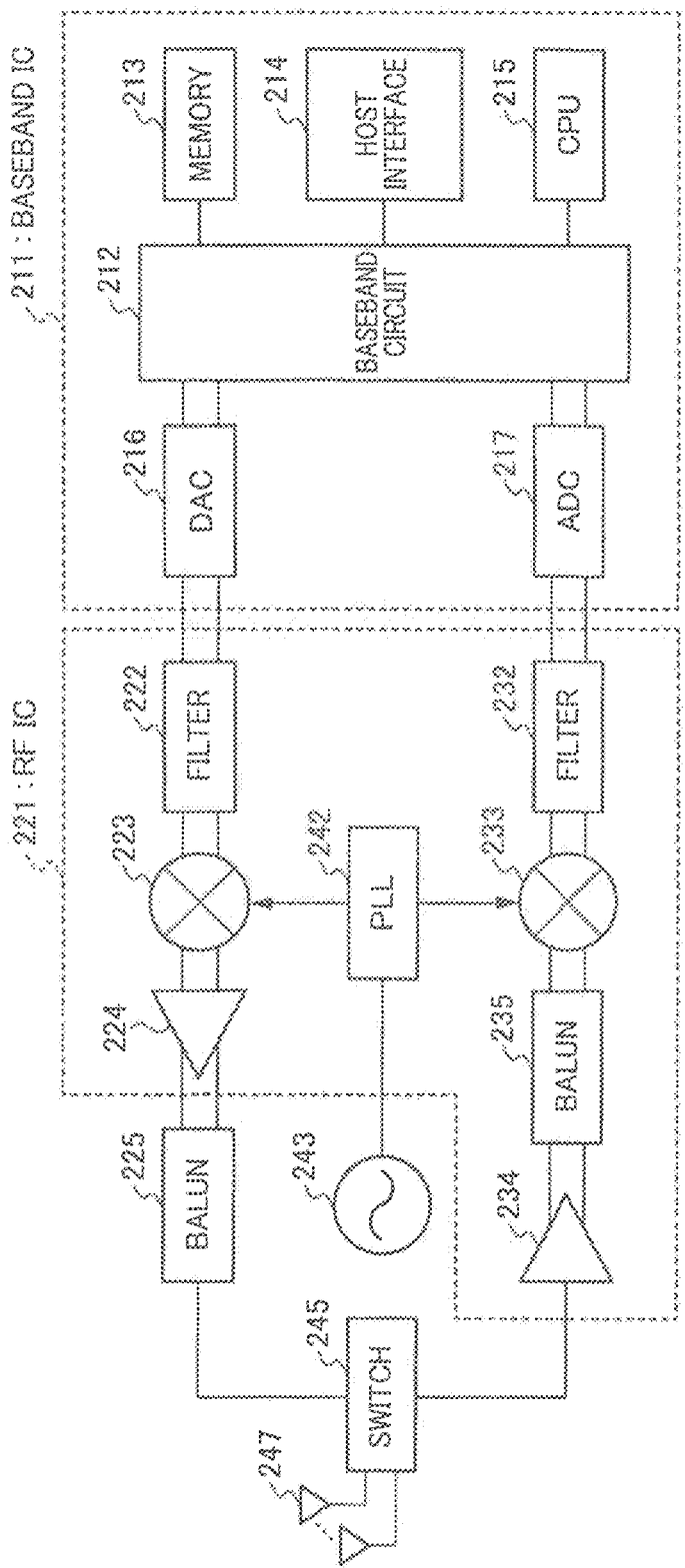
FIG. 22 is a diagram illustrating a hardware configuration example of a wireless LAN module installed in the terminal or the base station according to the third embodiment.

FIG. 22 shows an example of hardware configuration of a wireless LAN module. The configuration can also be applied when the wireless communication device is mounted on either one of the terminal that is a non-base station and the base station. Therefore, the configuration can be applied as an example of specific configuration of the wireless communication device. At least one antenna 247 is included in the example of configuration. When a plurality of antennas are included, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Fourth Embodiment

Figure 23A:
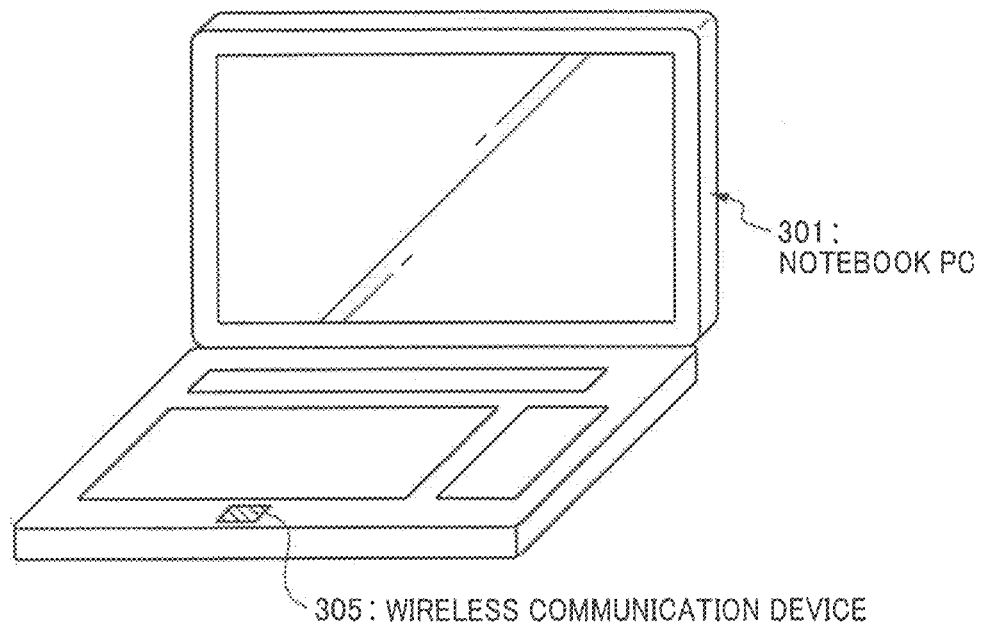
FIGS. 23A and 23B are perspective views of wireless communication terminals according to an embodiment of the present invention.
Figure 23B:

FIG. 23A and FIG. 23B are perspective views of wireless terminal according to the fourth embodiment. The wireless terminal in FIG. 23A is a notebook PC 301 and the wireless communication device (or a wireless device) in FIG. 23B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, vehicle and so on.

Figure 24:
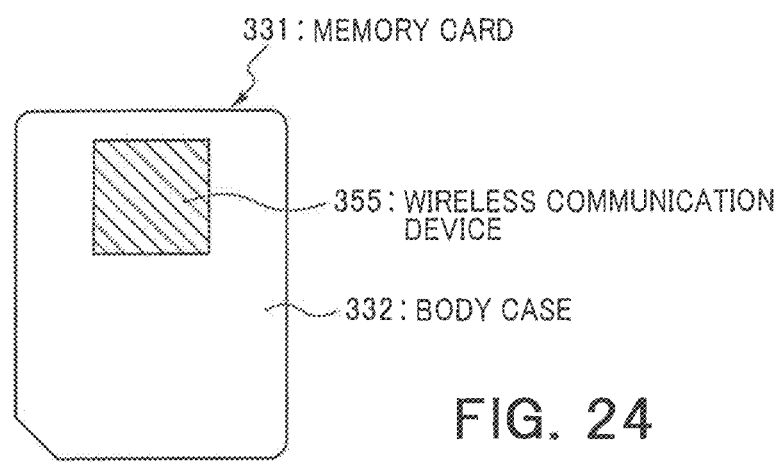
FIG. 24 is a diagram illustrating a memory card according to an embodiment of the present invention.

Moreover, a wireless communication device installed in a terminal (which may indicate a base station) can also be provided in a memory card. FIG. 24 illustrates an example of a wireless communication device mounted on a memory card. A memory card 331 contains a wireless communication device 355 and a body case 332. The memory card 331 uses the wireless communication device 355 for wireless communication with external devices. Here, in FIG. 24, the description of other installed elements (for example, a memory, and so on) in the memory card 331 is omitted.

Fifth Embodiment

In the fifth embodiment, a bus, a processor unit and an external interface unit are provided in addition to the configuration of the wireless communication device according to any of the embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the base station or the wireless terminal according to the present embodiment. Alternatively, the processing unit may be included in the integrated circuit of the wireless communication device installed in the base station, or in the integrated circuit of the wireless communication device installed in the wireless terminal.

Sixth Embodiment

In the sixth embodiment, a clock generating unit is provided in addition to the configuration of the wireless communication device according to any of the embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Seventh Embodiment

In the seventh embodiment, a power source unit, a power source controlling unit and a wireless power feeding unit are included in addition to the configuration of the wireless communication device according to any of embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Eighth Embodiment

In the eighth embodiment, a SIM card is added to the configuration of the wireless communication device according to any of the embodiments. For example, the SIM card is connected with the controller, the transmitter and the receiver. Thus, by adopting a configuration in which the SIM card is included in the wireless communication device, authentication processing can be easily performed.

Ninth Embodiment

In the ninth embodiment, a video image compressing/decompressing unit is added to the configuration of the wireless communication device according to the sixteenth embodiment. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Tenth Embodiment

In the tenth embodiment, an LED unit is added to the configuration of the wireless communication device according to any of the embodiments. For example, the LED unit is connected to at least one of the controller, the transmitter or the receiver. Thus, by adopting a configuration in which the LED unit is included in the wireless communication device, notifying the operation state of the wireless communication device to the user can be easily done.

Eleventh Embodiment

In the eleventh embodiment, a vibrator unit is included in addition to the configuration of the wireless communication device according to any of the embodiments. For example, the vibrator unit is connected to at least one of the controller, the transmitter or the receiver. Thus, by adopting a configuration in which the vibrator unit is included in the wireless communication device, notifying the operation state of the wireless communication device to the user can be easily done.

Twelfth Embodiment

In the twelfth embodiment, the configuration of the wireless communication device includes a display in addition to the configuration of the wireless communication device (which may indicate the wireless communication device mounted in the terminal, the wireless communication device mounted in the base station or both of them) according to any one of the above embodiments. The display may be connected to the MAC processor. As seen from the above, the configuration including the display to display the operation state of the wireless communication device on the display allows the operation status of the wireless communication device to be easily notified to a user.

Thirteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 25:
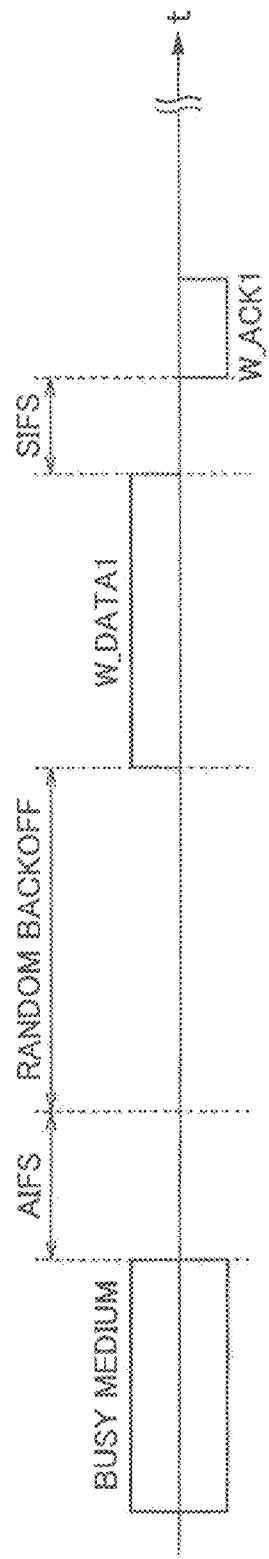
FIG. 25 is a diagram showing an example of frame exchange during a contention period.

Here, FIG. 25 illustrates one example of frame exchange in a competitive period based on the random access in IEEE802.11 wireless LAN When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

Note that the frames described in the embodiments may indicate not only things called frames in, for example, IEEE 802.11 standard, but also things called packets, such as Null Data Packets. When it is expressed that the base station transmits or receives a plurality of frames or a plurality of X-th frames, the frames or the X-th frames may be the same (for example, the same type or the same content) or may be different. An arbitrary value can be put into X according to the situation. The plurality of frames or the plurality of X-th frames may be transmitted or received at the same time or may be transmitted or received at temporally different timings. When it is expressed that a first frame, a second frame, and the like are transmitted or received at temporally different points, the expression of the first, the second, and the like is just an expression for distinguishing the frames, and the types and the content of the frames may be the same or different.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

What is claimed is:

1. A wireless communication device comprising:
a receiver configured to receive a first frame addressed to a first wireless communication device other than the wireless communication device;
controlling circuitry configured to set a first transmission prohibition period for a first network in response to determining that a sender of the first frame belongs to the first network to which the wireless communication device belongs based on a header of the first frame,
set a second transmission prohibition period for a second network in response to determining that the sender belongs to the second network, the second network being a network overlapping with the first network,
determine, when the receiver receives a second frame addressed to a second wireless communication device other than the wireless communication device during a carrier-sensing in a period during which the first transmission prohibition period is not set and the second transmission prohibition period is set, and when a reception level of the second frame is a first threshold or more, whether a sender network of the second frame is the first network or the second network based on a header of the second frame,
determine, in response to determining that the sender network is the first network, that a state of a wireless medium is or a busy state, and
compare, in response to determining that the sender network is the second network, the reception level of the second frame with a second threshold greater than the first threshold to determine whether a state of a wireless medium is an idle state or a busy state.

2. The wireless communication device according to claim 1, wherein
the header of the first frame is a header of a physical packet including the first frame, and
identification information of a sender network of the first frame is included in the header of the physical packet.

3. The wireless communication device according to claim 1, further comprising at least one antenna.

4. The wireless communication device according to claim 1, wherein the controlling circuitry is configured to
ignore the second transmission prohibition period when the first transmission prohibition period is not set even if the second transmission prohibition period is set, and determine whether the second frame is received in the receiver.

5. The wireless communication device according to claim 4, wherein the controlling circuitry is configured to
not determine whether the second frame is received in the receiver when the first transmission prohibition period is set even if the second transmission prohibition period is set, and wait until the first transmission prohibition period is canceled.

6. A wireless communication method performed in a wireless communication device comprising:
receiving a first frame addressed to a first wireless communication device other than the wireless communication device;
setting a first transmission prohibition period for a first network in response to determining that a sender of the first frame belongs to the first network to which the wireless communication device belongs based on a header of the first frame;
setting a second transmission prohibition period for a second network in response to determining that the sender of the first frame belongs to the second network;
determining, when the receiver receives a second frame addressed to a second wireless communication device other than the wireless communication during a carrier-sensing in a period during which the first transmission prohibition period is not set and the second transmission prohibition period is set, and when a reception level of the second frame is a first threshold or more, whether a sender network of the second frame is the first network or the second network based on a header of the second frame;
determining, in response to determining that the sender network is the first network, that a state of a wireless medium is a busy state;
comparing, in response to determining that the sender network is the second network, the reception level of the second frame with a second threshold greater than the first threshold to determine whether a state of a wireless medium is an idle state or a busy state.

* * * * *